(12) United States Patent
Sato et al.

(10) Patent No.: US 7,993,593 B2
(45) Date of Patent: Aug. 9, 2011

(54) OLEFIN POLYMERIZATION REACTOR, POLYOLEFIN PRODUCTION SYSTEM, AND POLYOLEFIN PRODUCTION PROCESS

(75) Inventors: Hideki Sato, Ichihara (JP); Hiroyuki Ogawa, Ichihara (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 394 days.

(21) Appl. No.: 12/331,730

(22) Filed: Dec. 10, 2008

(65) Prior Publication Data

US 2009/0149610 A1 Jun. 11, 2009

(30) Foreign Application Priority Data

Dec. 11, 2007 (JP) .................. 2007-320165

(51) Int. Cl.
- B01J 19/00 (2006.01)
- B01J 19/18 (2006.01)
- C08F 2/00 (2006.01)
- C08F 210/00 (2006.01)

(52) U.S. Cl. .......... 422/131; 422/134; 526/65; 526/348; 526/68

(58) Field of Classification Search ............ 526/65, 526/348, 68; 422/131, 134
See application file for complete search history.

(56) References Cited

U.S. PATENT DOCUMENTS

| | | |
|---|---|---|
| 2,477,454 A | 7/1949 | Heath |
| 2,867,506 A | 1/1959 | Roberts |
| 2,890,106 A | 6/1959 | Heath |
| 2,936,303 A | 5/1960 | Goins |
| 3,079,222 A | 2/1963 | Reeve |
| 3,242,586 A | 3/1966 | Peterson |
| 3,262,922 A | 7/1966 | Payne |
| 3,495,952 A | 2/1970 | Ulbrecht |
| 3,644,583 A | 2/1972 | Scoggin |
| 3,652,527 A | 3/1972 | Trieschmann et al. |
| 3,719,029 A | 3/1973 | Suzukawa et al. |
| 3,770,714 A | 11/1973 | Dorschner et al. |
| 3,776,979 A | 12/1973 | Hill |
| 3,957,448 A | 5/1976 | Shepard et al. |
| 3,971,768 A | 7/1976 | Peters et al. |
| 4,129,701 A | 12/1978 | Jezl et al. |
| 4,337,722 A | 7/1982 | Debayeux et al. |
| 4,373,272 A | 2/1983 | Jones et al. |
| 4,404,083 A | 9/1983 | Vasalos |

(Continued)

FOREIGN PATENT DOCUMENTS

CA 739660 A 8/1966

(Continued)

OTHER PUBLICATIONS

Search Report from Singapore Application No. 200809160-5 dated May 26, 2009.

(Continued)

Primary Examiner — William K Cheung
(74) Attorney, Agent, or Firm — Birch, Stewart, Kolasch & Birch, LLP

(57) ABSTRACT

An olefin polymerization reactor of the present invention includes a cylinder which extends vertically, and a decreasing diameter member which is formed on the cylinder, has an inside diameter that decreases progressively downward and has a gas inlet orifice at a bottom end thereof. A spouted bed is formed inside a reaction zone enclosed by an inside surface of the decreasing diameter member and an inside surface of the cylinder above the decreasing diameter member.

27 Claims, 5 Drawing Sheets

U.S. PATENT DOCUMENTS

| | | | |
|---|---|---|---|
| 4,419,330 A | 12/1983 | Ishihara et al. | |
| 4,441,822 A | 4/1984 | Biswas et al. | |
| 4,457,896 A | 7/1984 | Kono | |
| 4,466,082 A | 8/1984 | Zoschak et al. | |
| 4,518,750 A | 5/1985 | Govoni et al. | |
| 4,533,367 A | 8/1985 | Hadzismajlovic | |
| 4,640,339 A | 2/1987 | Klaren | |
| 4,744,413 A | 5/1988 | Klaren et al. | |
| 5,034,195 A | 7/1991 | Platz | |
| 5,213,768 A | 5/1993 | Maurel et al. | |
| 5,235,009 A | 8/1993 | Hogan | |
| 5,245,093 A | 9/1993 | Ember | |
| 5,536,378 A | 7/1996 | Gibson et al. | |
| 5,674,308 A | 10/1997 | Meissner et al. | |
| 5,676,201 A | 10/1997 | Klaren | |
| 6,066,701 A | 5/2000 | Koveal et al. | |
| 6,306,981 B1 | 10/2001 | Brown et al. | |
| 6,441,108 B1 | 8/2002 | Haendeler et al. | |
| 6,444,763 B1 | 9/2002 | Sagae et al. | |
| 6,518,372 B1 | 2/2003 | Weickert | |
| 6,689,845 B1 | 2/2004 | Govoni et al. | |
| 7,601,303 B1 | 10/2009 | Karer et al. | |
| 2006/0058474 A1 | 3/2006 | Covezzi et al. | |
| 2006/0063896 A1* | 3/2006 | McElvain et al. | 526/70 |
| 2007/0217966 A1 | 9/2007 | Heino et al. | |
| 2009/0149610 A1 | 6/2009 | Sato et al. | |
| 2009/0149620 A1* | 6/2009 | Sato et al. | 526/348 |
| 2010/0069581 A1* | 3/2010 | Ogawa et al. | 526/64 |
| 2010/0311923 A1* | 12/2010 | Sato et al. | 526/65 |

FOREIGN PATENT DOCUMENTS

| | | |
|---|---|---|
| DE | 2 077 628 A | 5/1981 |
| EP | 0088638 A2 | 9/1983 |
| EP | 0 241 947 A2 | 10/1987 |
| EP | 0 381 364 A1 | 8/1990 |
| EP | 1 484 343 A1 | 12/2004 |
| GB | 845655 | 8/1960 |
| GB | 954078 | 5/1961 |
| GB | 1147273 | 4/1969 |
| GB | 1 233 106 | 5/1971 |
| GB | 1233106 A | 5/1971 |
| GB | 1351624 | 5/1974 |
| GB | 1 587 891 | 4/1981 |
| GB | 2077528 A | 12/1981 |
| JP | 41-12916 | 7/1941 |
| JP | 46-11670 | 3/1971 |
| JP | 46-31969 | 9/1971 |
| JP | 47-42379 | 10/1972 |
| JP | 58-201802 A | 11/1983 |
| JP | 58-216735 A | 12/1983 |
| JP | 59-42039 A | 3/1984 |
| JP | 59-21321 B2 | 5/1984 |
| JP | 59-126406 A | 7/1984 |
| JP | 2-233708 A | 9/1990 |
| JP | 2675919 B2 | 7/1997 |
| JP | 2000-302807 A | 10/2000 |
| JP | 2002-515516 A | 5/2002 |
| JP | 2002-520426 A | 7/2002 |
| JP | 2002-537420 A | 11/2002 |
| JP | 3352059 B2 | 12/2002 |
| JP | 2003-277412 A | 10/2003 |
| JP | 2006-502263 A | 1/2006 |
| WO | WO-93/24533 A1 | 12/1993 |
| WO | WO-99/59712 A1 | 11/1999 |
| WO | WO 99/59712 A1 | 11/1999 |
| WO | 02/40547 A1 | 5/2002 |
| WO | WO-2007/071527 A1 | 6/2007 |

OTHER PUBLICATIONS

Search Report from Singapore Application No. 200809158-9 dated Jun. 4, 2009.
Search Report from Singapore Application No. 200809157-1 dated Jun. 4, 2009.
Search Report from Singapore Application No. 200809159-7 dated Jun. 4, 2009.
Search Report from Singapore Application No. 200809161-3 dated Jun. 4, 2009.
Office Action in U.S. Appl. No. 12/332,112 mailed Jun. 3, 2010.
"Terminology Dictionary of Powder Technology, 2nd Edition". Editor Society of Power Technology, Nikkan Kogyo Shimbun-sha, 2000, p. 321.
Mathur et al., "Spouted Beds", Academic Press, 1974, pp. 114-116 and 279-280.
Perry et al., "Solids-Drying Equipement", Perry's Chemical Engineers' Handbook, McGraw-Hill, 1997, pp. 12-75 and 12-76.
U.S. Office Action dated Jun. 15, 2010 for U.S. Appl. No. 12/332,055.
Search Report issued Nov. 10, 2010, in Singapore Patent Application No. 201004966-6.
Office Action issued Nov. 12, 2010, in copending U.S. Appl. No. 12/332,112.
Office Action issued Dec. 7, 2010, in U.S. Appl. No. 12/332,065.
Notice of Allowance issued Mar. 18, 2011, in copending U.S. Appl. No. 12/332,112.
Office Action issued Mar. 16, 2011, in copending U.S. Appl. No. 12/332,102.
Hatate et al. "Flow Characteristics of Draft Tube Spouted Bed and its Application", Journal of the Society of Powder Technology, vol. 34, No. 5, May 1997, pp. 343-360.
Hattori et al., "Minimum Spoutable Gas Flow Rate in Side-Outlet Spouted Bed with Inner Draft-Tube," Journal of Chemical Engineering of Japan, vol. 14, No. 6, 1981, pp. 462-466.
Ishikura et al., "Hydrodynamics of a Spouted Bed with a Porous Draft Tube", Kagaku Kougaku Ronbunshu, vol. 22, No. 3, 1996, pp. 615-621.
Ishikura et al., "Hydrodynamics of Modified Spouted Beds for Binary Mixtures of Particles—Effect of the Aeration Gas Flow Rate from Side Distributor", Fukuoka University Journal of Engineering, No. 58, Mar., 1997, pp. 155-165.
Ishikura, "Regime Map of Binary Particle Mixture in a Spout-Fluid Bed," Kagaku Kougaku Ronbunshu, vol. 19, No. 6, 1993, pp. 1189-1192.
Notice of Allowance dated Apr. 18, 2011 for U.S. Appl. No. 12/332,102.
Search Report dated Apr. 22, 2009 for Singapore Application No. 200809160-5.
Takeda et al., "Modified types of Spouted Beds—With the gas outlet located in the side wall surrounding the annular dense bed," Journal of JSEE, The Society of Chemical Engineers, Japan, vol. 1, No. 2, 1975, pp. 149-154.
Takenaka et al., "Fluidity characteristics of a spouted bed with a cylinder to cone-shaped perforated draft tubes," SCEJ 71st Annual Meeting, J123, 2006, 1 page.
Weickert et al., "New Reactor Concepts for the Gas-Phase Polymerization of Olefins," Chemie Ingenieur Technik, vol. 77, No. 8, 2005, pp. 977-978.
Yokokawa, "Fluidizing characteristics of fluidized bed and spouted bed, and their application", Journal of the Society of Powder Technology, vol. 21, No. 11, Nov. 1984, pp. 715-723.
Office Action issued May 26, 2011, in copending U.S. Appl. No. 12/332,112.
Office Action issued May 6, 2011, in copending U.S. Appl. No. 12/332,065.

* cited by examiner

OLEFIN POLYMERIZATION REACTOR, POLYOLEFIN PRODUCTION SYSTEM, AND POLYOLEFIN PRODUCTION PROCESS

BACKGROUND OF THE INVENTION

1. Field of the Invention

The present invention relates to an olefin polymerization reactor which uses a spouted bed, to a polyolefin production system which uses a spouted bed, and to a process for producing polyolefins such as polyethylene and polypropylene using such a reactor or system.

2. Related Background Art

Olefin polymerization reactors which polymerize, within a vessel and in the presence of a catalyst, an olefin monomer fed in as a gas or liquid to form granular polyolefin particles are known to the art. However, in a single vessel, the polyolefin particles approach a completely mixed state, as a result of which there is a tendency for a short path characterized by the discharge of particles that have not grown to a sufficient size to arise or for particles that have grown too large to accumulate within the vessel.

In such cases, the formed particles have a poor structural uniformity. Other problems that tend to arise include higher catalyst costs, increased catalyst residues, and larger numbers of defects (referred to as "fish-eyes" owing to the similarity in shape to the eye of a fish) in molded articles obtained by molding multistage polymers prepared by polymerization in a plurality of reaction zones. Moreover, with complete mixing, when the polymerization of different lots is carried out by varying the polymerization conditions, because it takes time to completely discharge from the vessel the polyolefin particles that were polymerized prior to the change in conditions, a large amount of off-specification product ends up forming. One conceivable way to deal with this problem is to connect a plurality of continuously stirred reactors in series so as to create overall a plug flow pattern. However, the equipment costs associated with connecting a plurality of reactors in series are considerable.

Accordingly, there exists a desire to obtain a narrower residence time distribution and achieve plug flow in a single reactor. Known examples of such reactors include those described in Patent Publication No. 2,675,919, U.S. Pat. No. 5,235,009, and Japanese Translation of PCT Application No. 2002-537420. In addition, reactors in which particles are mixed by means of a spouted bed are also known (see, for example, Japanese Translation of PCT Application No. 2002-520426, European Patent Laid-open Publication No. 1484343, Japanese Patent Application Laid-open No. S 58-216735, Japanese Patent Application Laid-open No. S 59-42039, and Japanese Translation of PCT Application No. 2002-515516).

SUMMARY OF THE INVENTION

However, the process of Patent Publication No. 2,675,919, in which a plurality of zones are formed within a vessel in the horizontal direction, requires that stirring paddles or the like be provided within the vessel. This results in a more complicated construction, in addition to which a large amount of energy is required for agitate the particles. In the process of U.S. Pat. No. 5,235,009, wherein a plurality of fluidized beds are connected in series in the vertical direction, the need to provide a freeboard at each stage may result in an enormous reactor height. In Japanese Translation of PCT Application No. 2002-537420, which carries out polymerization in a single pass within a tubular reactor, the tube must be made extremely long to achieve a sufficient residence time.

With circulating fluidized bed reactors like those described in Japanese Translation of PCT Application No. 2002-520426 and European Patent Laid-open Publication No. 1484343, each polyolefin particle repeatedly circulates within the reactor, making it difficult to remove polyolefin particles from the unit in a plug flow manner. Hence, the residence time distribution cannot be narrowed. The fluidized bed reactors described in Japanese Patent Application Laid-open No. S 58-216735, Japanese Patent Application Laid-open No. S 59-42039 and Japanese Translation of PCT Application No. 2002-515516 do not necessarily require gas dispersion plates, but there does exist room for improvement in terms of volume efficiency and pressure loss.

It is therefore an object of the present invention to provide an olefin polymerization reactor which has a simple construction, yet can substantially reduce the residence time distribution. Another object of the invention is to provide a polyolefin production system which likewise has a simple construction yet is able to substantially reduce the residence time distribution. A further object of the invention is to provide a polyolefin production process which uses such an olefin polymerization reactor or polyolefin production system.

The olefin polymerization reactor according to a first aspect of the invention includes a cylinder which extends vertically and a decreasing diameter member which is formed on the cylinder, has an inside diameter that decreases progressively downward, and has a gas inlet orifice at a bottom end thereof. A spouted bed is formed inside a reaction zone enclosed by an inside surface of the decreasing diameter member and an inside surface of the cylinder above the decreasing diameter member.

In the spouted bed-type olefin polymerization reactor of the invention, an olefin-containing gas is made to flow upward at a high velocity from the gas inlet orifice at the bottom end of the decreasing diameter member and into a reaction zone that holds catalyst-containing polyolefin particles and where a particle bed is to be formed, thereby forming a spouted bed within the reaction zone. As used herein, "spouted bed" refers to a particle bed state characterized by the circulatory movement of particles, wherein there forms, in a particle bed composed of polyolefin particles (sometimes referred to below as simply "particles") and under the action of an olefin-containing gas from the gas inlet orifice, a "spout" (or spout portion) which has a dilute particle concentration near the center axis of the cylinder and in which particles flow upward together with the gas, and at the same time there also forms at the periphery of the spout an annular structure where particles fall in a moving bed state under the influence of gravity.

A portion of the olefin-containing gas blown in from the gas inlet orifice forms the spout and sweeps past the particle bed, and the remainder diffuses into the portion of the particle bed having an annular structure. The solid-gas contact between the olefin-containing gas and polyolefin particles in this way allows the polyolefin particles to grow trough olefin polymerization within the reaction zone.

Generally, when compared with a fluidized bed, a spouted bed is known to be capable of exhibiting an excellent performance in terms of pressure loss and, owing to circulatory movement of the particles, to give rise to mixing which somewhat approximates plug flow. Therefore, an advantage of the spouted bed-type olefin polymerization reactor according to the present invention is that it can make the residence time distribution of particles in the reaction zone narrower than in prior-art reactors which employ a fluidized bed. Another advantage is that when relatively large polyolefin particles with sizes on the order of several millimeters that would require a very high gas velocity for fluidization in a fluidized bed are produced, such particles can be fluidized at a lower gas velocity in a spouted bed than in a fluidized bed.

The olefin polymerization reactor according to a second aspect of the invention includes a cylinder which extends vertically; a decreasing diameter member which is formed on the cylinder, has an inside diameter that decreases progressively downward, and has a gas inlet orifice at a bottom end thereof; and a deflector which is disposed at a position, within a reaction zone enclosed by an inside surface of the decreasing diameter member and an inside surface of the cylinder above the decreasing diameter member, that faces the gas inlet orifice, and which has an outside diameter that increases progressively downward, is closed at a top end thereof, and a bottom end of which is spaced apart from an inside wall of the cylinder.

In a conventional fluidized bed-type reactor, a constant freeboard zone must be secured in order to suppress particle scatter. However, in the reactor according to the second aspect of the present invention, disposing a deflector above the reaction zone enables the scattering of spouted particles to be suppressed. As a result, the freeboard zone can be shortened, making it possible to achieve a higher volume efficiency than in a fluidized bed reactor.

It is preferable for the olefin polymerization reactors of the invention to have a plurality of the reaction zones and for polyolefin particles to pass sequentially through the reaction zones. From the standpoint of saving space in the reactor, it is even more preferable for the plurality of reaction zones to be each formed in a vertical row and for the polyolefin particles to pass sequentially from an upper reaction zone to a lower reaction zone. By providing a plurality of reaction zones and multi-staging the spouted beds, the residence time distribution for the particles can be made sufficiently small. Moreover, as described above, a spouted bed differs from a conventional fluidized bed in that it gives rise to mixing which somewhat approximates plug flow. As a result, the residence time distribution can be narrowed to a similar degree with a smaller number of stages than by multi-staging fluidized beds.

It is preferable for the olefin polymerization reactor provided with, as described above, a plurality of reaction zones in series and having multiple spouted beds to have means for transferring polyolefin particles from an upstream-side reaction zone to a downstream-side reaction zone. An ejector system may be used as this transferring means. The transferring means preferably includes a particle removing line for removing polyolefin particles from the upstream-side reaction zone, an ejector provided on the particle removing line, and a particle feeding line for feeding polyolefin particles from the ejector to the downstream-side reaction zone. In cases where an ejector system is used, it is even more preferable for the transferring means to further include an on-off valve provided at an intermediate position on the particle removing line, and a gas feeding line which communicates with the particle removing line on both an upstream side and a downstream side of the on-off valve and feeds a gas to prevent clogging within the particle removing line. By employing such an arrangement, clogging of the on-off valve and the ejector can be adequately prevented.

It is also possible, in an olefin polymerization reactor having a plurality of reaction zones formed in a vertical row and having multiple spouted beds in the vertical direction, to employ as the transferring means a downcomer instead of the above-described ejector system. The downcomer is situated so as to pass through the decreasing diameter member, and allows polyolefin particles to fall from an upstream-side upper reaction zone to a downstream-side reaction zone.

In the inventive reactor, it is preferable for the decreasing diameter member to have an angle of inclination between the inside surface thereof and the horizontal, which is larger than an angle of repose for the polyolefin particles within the reaction zone. This enables downward movement by the polyolefin particles to be smooth and makes it easy to narrow the residence time distribution. It is especially preferable for the decreasing diameter member to have an angle of inclination between the inside surface thereof and the horizontal, which is an angle at which all of the polyolefin particles within the reaction zone can be gravitationally discharged. In this case, movement of the polyolefin particles becomes especially smooth.

Also, the ratio $d_A/d_B$ between the orifice diameter $d_A$ of the gas inlet orifice and the cylinder inside diameter $d_B$ is preferably 0.35 or less. Using this arrangement facilitates the formation of a stable spouted bed having good particle circulation in the reaction zone.

In addition, it is preferable in the inventive reactor for the deflector to have an angle of inclination between an outside surface thereof and the horizontal, which is larger than an angle of repose for the polyolefin particles within the reaction zone. This discourages polyolefin particles from sticking to the deflector. Moreover, it is preferable for the deflector to have an outside surface of conical shape.

The polyolefin production process according to another aspect of the invention involves carrying out olefin polymerization by using the above-described olefin polymerization reactor of the invention to form a spouted bed of polyolefin particles within the reaction zone. The polyolefin production method of the invention may include the step of continuously feeding olefin to the olefin polymerization reactor and at the same time continuously removing a gas containing unreacted olefin from the olefin polymerization reactor and returning the removed gas to the olefin polymerization reactor, and the step of cooling some or all of the removed gas so as to obtain an olefin-containing condensate. In this case, it is preferable for the condensate to be fed to a spout portion of the spouted bed formed within the reaction zone. This makes it possible to utilize the latent heat of vaporization of the condensate, enabling heat removal from the olefin polymerization reactor by the condensate to be carried out efficiently. Moreover, in cases where the olefin polymerization reactor has a deflector, the condensate may be fed to a bottom portion of the deflector. This has the advantage of enabling a condensate feeding line to be installed using a jig for the deflector.

The polyolefin production system according to yet another aspect of the invention includes an olefin pre-reactor for polymerizing olefin in the presence of an olefin polymerization catalyst and forming polyolefin particles, and the above-described olefin polymerization reactor of the invention which is connected as a subsequent stage to the olefin pre-reactor.

The polyolefin production process of the invention carries out multistage olefin polymerization using the above-described polyolefin production system of the invention. When a bulk polymerization reactor is employed as the olefin pre-reactor, the polyolefin production method of the invention preferably includes the step of feeding a slurry containing polyolefin particles and liquid olefin from the bulk polymerization reactor to the olefin polymerization reactor. In this case, it is desirable for the slurry to be fed to the olefin polymerization reactor in such a manner that, in the reaction zone within the olefin polymerization reactor, the liquid olefin present in the slurry has a superficial velocity following gasification which does not exceed a minimum fluidization velocity of the polyolefin particles held in the reaction zone. Alternatively, it is desirable for the slurry to be fed into the olefin polymerization reactor from a higher position than a powder level of the spouted bed that is formed in the reaction zone within the olefin polymerization reactor. By setting the slurry feed rate or feed position in the foregoing manner, the flow state of the spouted bed can be fully prevented from becoming unstable with gasification of the liquid olefin.

The "superficial velocity" of the liquid olefin following gasification referred to herein is the value obtained by converting the volumetric flow rate of the liquid olefin fed to the olefin polymerization reactor to the volumetric flow rate following gasification, and dividing the latter by the cross-sectional area A of the olefin polymerization reactor cylinder ($A=\pi D^2/4$, where D is the inside diameter of the cylinder).

The present invention provides an arrangement which, although simple, enables a narrow residence time distribution to be achieved As a result, when an olefin polymer is continuously produced, it is possible to produce polymer having an excellent structural uniformity, in addition to which polymer replacement in the reactor with changes in the production conditions is easy.

DESCRIPTION OF THE PREFERRED EMBODIMENTS

Preferred embodiments of the invention are described in detail below while referring to the attached diagrams where necessary. Unless noted otherwise, positional relationships such as up-down and left-right are based on the relative positions shown in the diagrams. Relative dimensions of features shown in the diagrams may not be true to scale.

Polyolefin Production System

Figure 1:
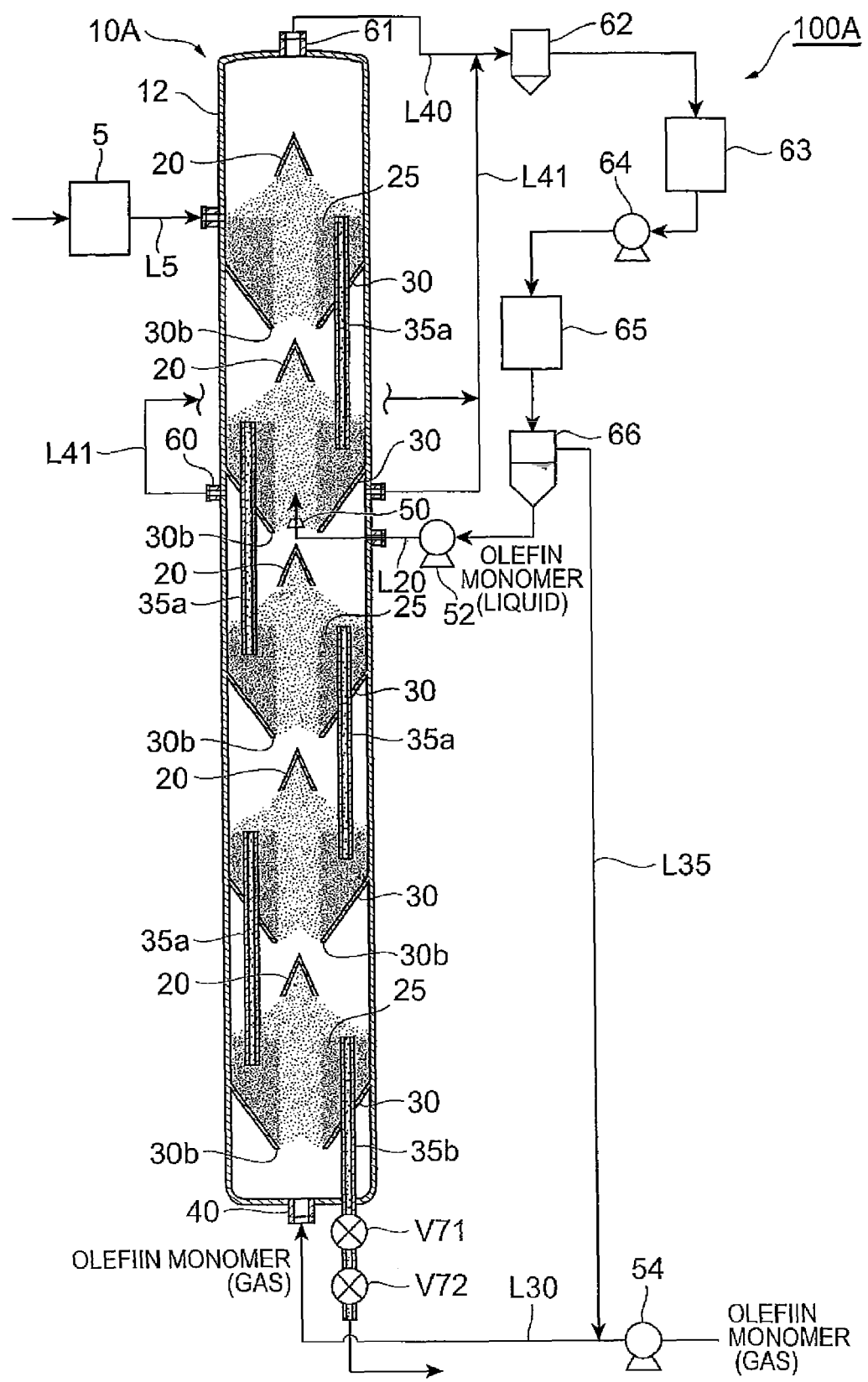
FIG. 1 is a schematic view of an embodiment of the polyolefin production system according to the present invention.

FIG. 1 shows a polyolefin production system 100A according to the present embodiment. This production system 100A includes an olefin prepolymerization reactor 5, and an olefin polymerization reactor 10A which is connected as a subsequent stage to the olefin prepolymerization reactor 5.

Olefin Prepolymerization Reactor

The olefin prepolymerization reactor 5 polymerizes olefin in the presence of an olefin polymerization catalyst to form polyolefin particles.

Examples of the olefin prepolymerization reactor 5 include, but are not limited to, slurry polymerization reactors, bulk polymerization reactors, stirred tank-type gas phase polymerization reactors, and fluidized bed-type gas phase polymerization reactors. Any one of these reactors may be used alone, a plurality of reactors of the same type may be used in combination, or two or more reactors of differing types may be used in combination.

Slurry polymerization reactors that may be used include known polymerization reactors, such as the stirred tank-type reactors and loop-type reactors described in Japanese Patent Publication No. S 41-12916, Japanese Patent Publication No. S 46-11670 and Japanese Patent Publication No. S 47-42379. Slurry polymerization is a process in which a polymerization solvent is prepared by adding an olefin monomer such as propylene or butene to an inert solvent such as an aliphatic hydrocarbon (e.g., propane, butane, isobutane, pentane, hexane, heptane, octane) or an alicyclic hydrocarbon (e.g., cyclopentane, cyclohexane), an olefin polymerization catalyst is dispersed in the polymerization solvent to form a slurry, and polymerization is carried out in a state where the polymer that is formed does not dissolve in the polymerization solvent. Polymerization is carried out at a temperature and pressure at which the polymerization solvent is maintained in a liquid state and the polymer that is formed does not dissolve in the polymerization solvent. The polymerization temperature is generally from 30 to 100° C., and preferably from 50 to 80° C. The polymerization pressure is generally from standard pressure to 10 MPaG, and preferably from 0.3 to 5 MPaG.

Bulk polymerization reactors that may be used include known polymerization reactors, such as the stirred tank-type reactors and loop-type reactors described in Japanese Patent Publication No. S 41-12916, Japanese Patent Publication No. S 46-11670 and Japanese Patent Publication No. S 47-42379. Bulk polymerization is a process in which an olefin monomer such as propylene or butene is used as the polymerization solvent in the substantial absence of inert solvents such as aliphatic hydrocarbons (e.g., propane, butane, isobutane, pentane, hexane, heptane, octane) and alicyclic hydrocarbons (e.g., cyclopentane, cyclohexane), an olefin polymerization catalyst is dispersed in the polymerization solvent, and polymerization is carried out in a state where the polymer that is formed does not dissolve in the polymerization solvent. Polymerization is carried out at a temperature and pressure at which the polymerization solvent is maintained in a liquid state and the polymer that is formed does not dissolve in the polymerization solvent. The polymerization temperature is generally from 30 to 100° C., and preferably from 50 to 80° C. The polymerization pressure is generally from standard pressure to 10 MPaG, and preferably from 0.5 to 5 MPaG.

Stirred tank-type gas phase polymerization reactors that may be used include known polymerization reactors, such as the reactors described in Japanese Patent Application Laid-open No. S 46-31696 and Japanese Patent Publication No. S 59-21321. Stirred tank-type gas phase polymerization is a process in which a monomer in a gaseous state is used as the medium and, while maintaining an olefin polymerization catalyst and olefin polymer in a fluidized state within the medium by means of an agitator, the monomer in the gaseous state is polymerized. The polymerization temperature is generally from 50 to 110° C., and preferably from 60 to 100° C. The polymerization pressure should be in a range at which the olefin can be present as a vapor phase within the stirred tank-type gas phase polymerization reactor, and is generally from standard pressure to 5 MPaG, and preferably from 0.5 to 3 MPaG.

Fluidized bed-type gas phase polymerization reactors that may be used include known reactors, such as the reactors described in Japanese Patent Application Laid-open No. S 58-201802, Japanese Patent Application Laid-open No. S 59-126406 and Japanese Patent Application Laid-open No. H 2-233708. Fluidized bed-type gas phase polymerization is a process in which a monomer in a gaseous state is used as the medium and, while maintaining primarily an olefin polymerization catalyst and olefin polymer in a fluidized state within the medium by the flow of the medium, the monomer in the gaseous state is polymerized. In some cases, an agitator is also provided to promote fluidization. The polymerization temperature is generally from 0 to 120° C., preferably from 20 to 100° C., and more preferably from 40 to 100° C. The polymerization pressure should be in a range at which the olefin can be present as a vapor phase within the fluidized bed-type reactor, and is generally from standard pressure to 10 MPaG, preferably from 0.2 to 8 MPaG, and more preferably from 0.5 to 5 MPaG.

Combinations of different reactors are exemplified by a slurry polymerization reactor or a bulk polymerization reactor, to which is connected, as the subsequent stage, a fluidized bed-type gas phase polymerization reactor or a stirred tank-type gas phase polymerization reactor.

Alternatively, a flushing tank for separating unreacted olefin or polymerization solvent from olefin polymer particles may generally be provided between a slurry polymerization reactor or a bulk polymerization reactor and, connected thereto as the subsequent stage, a gas phase polymerization reactor such as a fluidized bed-type gas phase polymerization reactor, a stirred tank-type gas phase polymerization reactor or the subsequently described olefin polymerization reactor 10A. However, such a flushing tank is not always required; particularly in cases where a bulk polymerization reactor is used, a flushing tank is often not provided.

Olefin Polymerization Reactor

The olefin polymerization reactor 10A is a reactor which carries out, in a substantially gas phase state, an olefin polymerization reaction on polyolefin particles formed by the olefin prepolymerization reactor 5.

Referring to FIG. 1, the olefin polymerization reactor 10A is composed primarily of a cylinder 12 which extends vertically, a plurality of deflectors 20 provided inside the cylinder 12, and a plurality of tubular baffles (decreasing diameter members) 30 provided inside the cylinder 12. The deflectors 20 and tubular baffles 30 are alternately disposed in the axial direction of the cylinder 12. Also, it is preferable for both the deflectors 20 and the tubular baffles 30 to be disposed coaxially with the center axis of the cylinder 12. From the standpoint of stabilizing the spouted bed, the inside diameter of the cylinder 12 is preferably not more than 5 m, and more preferably not more than 3.5 m.

In the olefin polymerization reactor 10A, five reaction zones 25 are formed in a vertical row inside the cylinder 12. Each reaction zone 25 is a region enclosed by the outside surface of a tubular baffle 30, the inside surface of the tubular baffle 30 directly below, and the inside surface of the portion of the cylinder 12 between these two tubular baffles 30. The topmost reaction zone 25 is a region enclosed by the inside surface of the cylinder 12 at the top thereof, the inside surface of the tubular baffle 30 directly below the top of the cylinder 12, and the inside surface of the portion of the cylinder 12 therebetween.

Within each reaction zone 25, an olefin-containing gas flows upward at a high velocity from a gas inlet orifice formed at a bottom end 30b of the tubular baffle 30, thereby forming a spouted bed of polyolefin particles.

Figure 2:
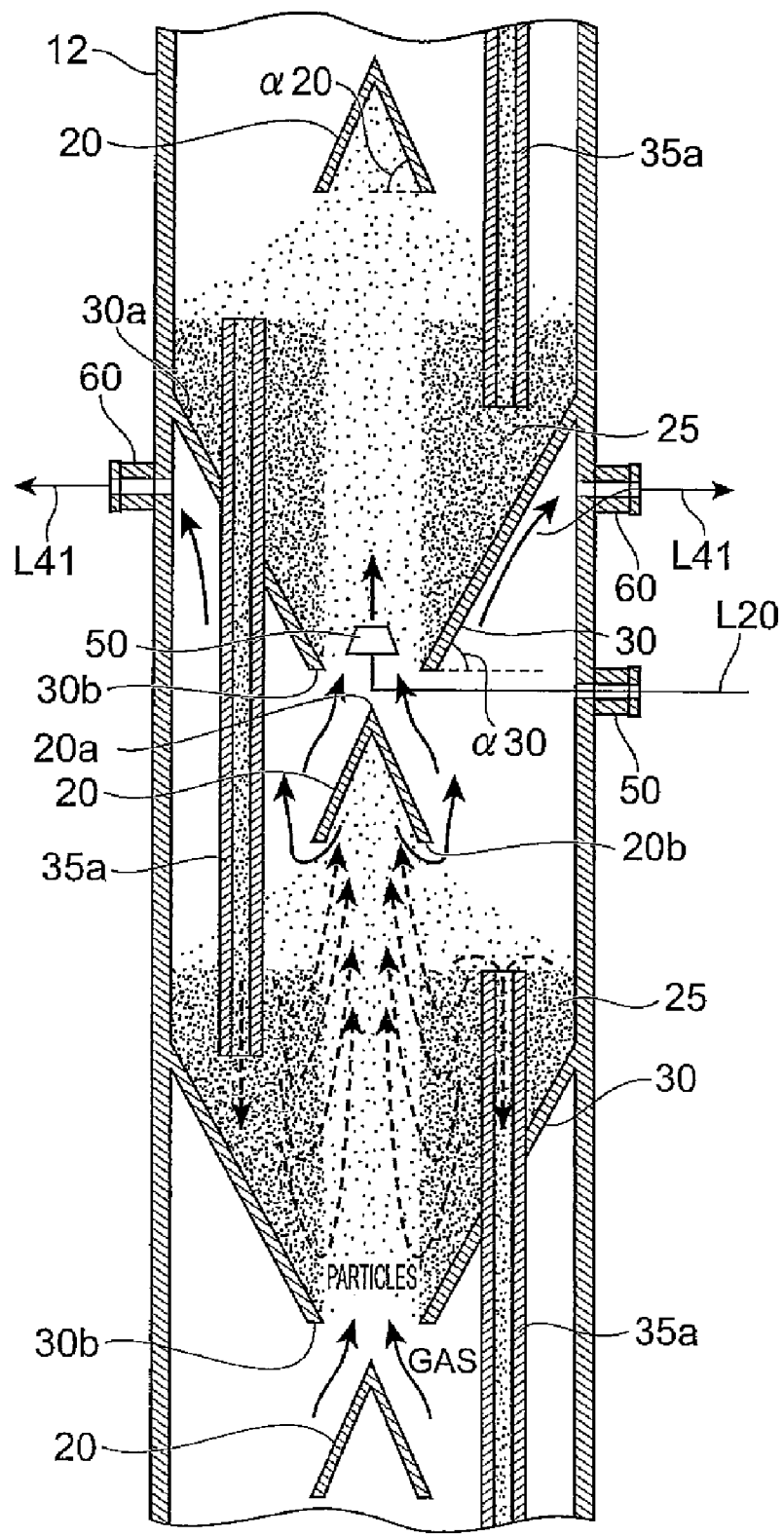
FIG. 2 is an enlarged schematic cross-sectional view of the olefin polymerization reactor 10A in FIG. 1.

As shown in FIG. 2, in each reaction zone 25, a deflector 20 is disposed at a position that lies above the tubular baffle 30 and faces the gas inlet orifice. The role of the deflector 20 is to prevent spouted polyolefin particles from scattering. This makes it possible to shorten the freeboard zone, enabling a high volume efficiency to be achieved.

The deflector 20 has a conical shape with a top end 20a that is closed, an outside diameter which increases progressively downward, and a bottom end 20b that is spaced apart from the inside wall of the cylinder 12. As a result, particles that have been blown upward collide with the inside surface of the deflector 20 and are taken up into the annular structure of the spouted bed. At the same time, gases circulate upward by passing between the bottom end 20b of the deflector 20 and the inner wall of the cylinder 12.

Each tubular baffle 30 is a tapered cylinder which has an inside diameter that progressively decreases in the downward direction, and has a top end 30a that is contiguous with the inside wall of the cylinder 12. Such an arrangement allows gases to circulate upward from a circular gas inlet orifice at a bottom end 30b of the tubular baffle 30, but does not allow the gases to circulate upward between the top end 30a and the cylinder 12. The gas inlet orifice formed at the bottom end 30b may have disposed thereon a check valve (not shown) so that polyolefin particles within the reaction zone 25 do not flow downward through the gas inlet orifice at such times as startup or temporary shutdown of the olefin polymerization reactor 10A.

As shown in FIG. 1, four upper downcomers 35a are provided so as to pass through each of the four upper tubular baffles 30 within the cylinder 12, and a bottom downcomer 35b is provided in the bottommost tubular baffle 30. The upper downcomers 35a allow polyolefin particles to fall from an upper reaction zone 25 to a lower reaction zone 25. The purpose of the bottom downcomer 35b is to remove polyolefin particles from the bottommost reaction zone and discharge the particles outside of the cylinder 12. Two valves V71 and V72 are arranged in series with the bottom downcomer 35b. The polyolefin particles can be discharged in a subsequent step by successively opening and closing these valves V71 and V72.

To form a stable spouted bed in each reaction zone 25, it is desirable that each tubular baffle 30 satisfy the following conditions. Namely, the ratio $d_A/d_B$ between the diameter $d_A$ of the gas inlet orifice at the bottom end 30b of the tubular baffle 30 and the inside diameter $d_B$ of the cylinder 12 is preferably 0.35 or less. Also, the angle of inclination α30 of the tubular baffle 30 in FIG. 2, i.e., the angle of the inside surface of the tubular baffle 30 with the horizontal, is preferably at least the angle of repose for polyolefin particles present within the cylinder 12. The angle of inclination α30 is more preferably at least the angle of repose and at least the angle at which the polyolefin particles can be completely discharged gravitationally. In this way, smooth downward movement of the polyolefin particles is achieved.

Although a spouted bed can be formed even using a flat plate with a gas inlet orifice formed therein instead of a tubular baffle 30, a region where particles do not fluidize will arise on such a flat plate near the inside surface of the cylinder 12. As a result, due to poor heat removal in this region, the particles may fuse together into masses. To avoid such a situation, it is thus desirable for the tubular baffles 30 to have an angle of inclination α30 which, as noted above, is at least a given angle.

It is preferable for the deflectors 20 in FIG. 2 to have an angle of inclination α20, i.e., the angle formed between the outside surface of the deflector 20 and the horizontal, which is at least the angle of repose for polyolefin particles present within the cylinder 12. In this way, polyolefin particles can be adequately prevented from sticking to the deflectors 20.

Polyolefin particles have an angle of repose of, for example, from about 35° to about 50°. The angles of inclination α30 and α20 are both preferably at least 55°.

The deflectors 20 and tubular baffles 30 are each attached to the cylinder 12 by supports (not shown). The supports have substantially no influence on gas flow and polyolefin flow. The cylinder 12, deflectors 20 and tubular baffles 30 may be made of, for example, carbon steels and stainless steels such as "SUS 304" and "SUS 316L". As used herein, "SUS" refers to a stainless specification standardized by Japanese Industrial Standards (JIS). It is preferable to use "SUS 316L" when a catalyst which are high in corrosive ingredient (e.g., a halogen such as chlorine) is to be employed.

As shown in FIG. 1, a gas feeding nozzle 40 is provided at the bottom of the cylinder 12, and gaseous olefin monomer is fed to the bottom of the cylinder 12 by way of a line L30 and a compressor 54. In addition, a gas discharge nozzle 61 is provided at the top of the cylinder 12. Gas which has risen up through the cylinder 12 is discharged to the exterior through a line L40, and gas-entrained particles are removed by an optionally provided cyclone 62. After the gas has passed through treatment in a first heat exchanger 63, a compressor 64, a second heat exchanger 65 and a gas-liquid separator 66, it is introduced to line L30 via another line L35 and recycled. In addition to the gas feeding nozzle 40, a discharge nozzle (not shown) which is capable of discharging polyolefin particles at the end of reactor operation may also be provided at the bottom of the cylinder 12. Also, to reduce the amount of powder remaining inside the olefin polymerization reactor 10A at the end of reactor operation, it is preferable to provide an interior member in the shape of an inverted cone (not shown) at a position which does not interfere with gas flow at the bottom of the cylinder 12.

The cylinder 12 is also provided with a liquid feed nozzle 50 which feeds, from outside the cylinder 12 to a given reaction zone 25, liquid olefin that has been separated by the gas-liquid separator 66. Specifically, as shown in FIG. 1, a liquid feed nozzle 50 is situated near the gas inlet orifice of the second tubular baffle 30 from the top so as to inject liquid olefin toward the spout. If necessary, a pump 52 and a line L20 for feeding the liquefied olefin monomer are connected to the liquid feed nozzle 50. In FIG. 1, the liquid feed nozzle 50 is disposed near the gas inlet orifice of the tubular baffle 30. However, the liquid feed nozzle 50 is not limited to such a position and may instead be disposed, for example, near the bottom end of a deflector 20. The liquid feed nozzle 50 is preferably provided in a high gas velocity region, such as a spouting area where a spout is formed.

Also, a plurality of gas discharge nozzles 60 are provided in portions of the cylinder 12 facing the outside surfaces of the tubular baffles 30. More specifically, as shown in FIG. 1, a gas discharge nozzle 60 is provided in the portion of the cylinder 12 facing the outside surface of the second tubular baffle 30 from the top. This gas discharge nozzle 60 is connected to line L40 by way of a line L41. The amount of gas discharged from the gas discharge nozzles 60 is controlled by respective valves or other means so as to be substantially equal to the amount of gas that has been fed in from the liquid feed nozzle 50 and vaporized. Therefore, even when liquefied olefin monomer has been fed into the cylinder 12 via the liquid feed nozzle 50, the superficial velocity of the gas inside the cylinder 12 is kept substantially constant in the vertical direction.

In addition, a line L5 is connected to a position on the cylinder 12 which is higher than the topmost tubular baffle 30, and polyolefin particles containing solid particles of a olefin polymerization catalyst are fed through this line L5 to the topmost reaction zone 25.

Accordingly, in the present embodiment, a two-stage polymerization step is achieved by the olefin prepolymerization reactor 5 and the olefin polymerization reactor 10A. In this way, the olefin prepolymerization reactor 5 effects the polymerization and growth of polyolefin particles, creating relatively large polyolefin particles having a particle size of preferably at least 500 μm, more preferably at least 700 μm, and even more preferably at least 850 μm, thereby enabling the formation of a more stable spouted bed. However, it is also possible to have the polymerization step be composed of a single stage that does not include an olefin prepolymerization reactor 5. In this case, an olefin polymerization catalyst or prepolymerization catalyst is fed directly to the olefin polymerization reactor 10A, and olefin polymerization is carried out. Alternatively, one or more additional olefin polymerization reactor, such as an olefin prepolymerization reactor 5 or an olefin polymerization reactor 10A, may be provided subsequent to the olefin polymerization reactor 10A so as to achieve a polymerization step composed of three or more stages.

Olefin, Polyolefin and Catalyst

Next, the olefin, polyolefin, catalyst and other substances used in such a system are described.

In the olefin polymerization reactor, polyolefin production process and polyolefin production system of the invention, polyolefin—i.e., olefin polymer (olefin homopolymer, olefin copolymer)—production is carried out by the polymerization of one or more olefin (homopolymerization or copolymerization). Examples of olefins that may be used in this invention include ethylene, propylene, 1-butene, 1-pentene, 4-methyl-1-pentene, 5-methyl-1-hexene, 1-hexene, 1-heptene and 1-octene.

One or more of these olefins may be used. Alternatively, the olefin used may be changed in each polymerization step. In cases where polymerization is carried out as a multistage process, a different olefin may be used in each stage. When two or more olefins are used, examples of suitable olefin combinations that may be employed include propylene/ethylene, propylene/1-butene, propylene/ethylene/1-butene, ethylene/1-butene, ethylene/1-hexene and ethylene/1-octene. In addition to olefins, it is also possible to use at the same time various copolymeric ingredients such as dienes.

Olefin polymers (homopolymers, copolymers) such as propylene homopolymers, propylene/ethylene copolymers, propylene/1-butene copolymers and propylene/ethylene/1-butene copolymers may be advantageously produced in the present invention. The production of olefin polymers obtained by multistage polymerization in which the proportions of the monomer units serving as the polymer ingredients differ in the respective stages is especially preferred. For example, it is possible to form a multistage-polymerized olefin copolymer by feeding one type of olefin to an olefin prepolymerization reactor 5 and an olefin polymerization reactor 10A so as to form homopolymer particles, or copolymerizing the first olefin with a small amount of another olefin to form random copolymer particles, then feeding, in a subsequent stage, two or more types of olefin to these polymer particles in an additional olefin polymerization reactor such as an olefin prepolymerization reactor 5 or an olefin polymerization reactor 10A. This results in a narrow residence time distribution in the olefin polymerization reactor 10A, making it easy to achieve a fixed compositional ratio within the polymer particles. This approach is especially effective for reducing molding defects.

Examples of such polymers include propylene-propylene/ethylene polymers, propylene-propylene/ethylene-propylene/ethylene polymers, propylene/ethylene-propylene/ethylene polymers and propylene-propylene/ethylene/1-butene polymers. Here, a dash ("-") indicates the boundary between polymers, and a slash ("/") indicates that two or more olefins are copolymerized within the polymer. Of these, the production of multistage-polymerized propylene-based copolymers which are polymers having propylene-based monomer units, are called "high-impact polypropylene" (in Japan, also customarily called "polypropylene block copolymers"), and have crystalline propylene-based polymer segments and amorphous propylene-based polymer segments, is preferred. A multistage polymerized propylene-based copolymer can be prepared by the continuous multistage polymerization, in any order, of crystalline homopolypropylene segments or random copolymer segments obtained by copolymerizing a small amount of an olefin other than propylene, with amorphous rubber segments copolymerized from ethylene, propylene and, as an optional ingredient, an olefin other than ethylene and propylene, in the presence of the respective polymers. Such a copolymer has an intrinsic viscosity, as measured in 1,2,3,4-tetrahydronaphthalene at 135° C., which is preferably in a range of from 0.1 to 100 dl/g. This multistage polymerized polypropylene-based copolymer has excellent heat resistance, rigidity and impact resistance, and can therefore be used in automotive components such as bumpers and door trim, and in various packaging containers such as retortable food packaging containers.

Moreover, in the olefin polymerization reactor and polyolefin production process of the invention, to broaden the molecular weight distribution of the olefin polymer, the olefin polymer components produced in respective polymerization steps may be given different molecular weights. The present invention is also advantageous for producing olefin polymers having a broad molecular weight distribution. For example, the intrinsic viscosity obtained by measurement as described above for the polymer component obtained in the polymerization step that produces the highest molecular weight polymer component is in a range of preferably from 0.5 to 100 dl/g, more preferably from 1 to 50 dl/g, and even more preferably from 2 to 20 dl/g. This intrinsic viscosity is at least five times the intrinsic viscosity of the polymer component obtained in the polymerization step that produces the lowest molecular weight polymer component. The present invention can advantageously produce an olefin polymer in which the amount of the polymer component obtained in the polymerization step which produces the highest molecular weight polymer component accounts for from 0.1 to 80 wt % of the olefin polymer.

The olefin polymerization catalyst used in the invention may be a known addition polymerization catalyst used in olefin polymerization. Illustrative examples include Ziegler-type solid catalysts formed by contacting a solid catalyst component containing titanium, magnesium, a halogen and an electron donor (referred to below as "catalyst component A") with an organoaluminum compound component and an electron donor component; and metallocene-type solid catalysts prepared by supporting a metallocene compound and a cocatalyst component on a granular carrier. Combinations of these catalysts may also be used.

What is commonly referred to as a titanium/magnesium composite catalyst may be used as catalyst component A employed in the preparation of a Ziegler-type solid catalyst. This composite catalyst may be obtained by contacting a titanium compound, a magnesium compound and an electron donor such as the following.

Titanium compounds that may be used to prepare catalyst component A are exemplified by titanium compounds having the general formula $Ti(OR^1)_aX_{4-a}$ (where $R^1$ is a hydrocarbon group of 1 to 20 carbons, X is a halogen atom, and the letter a is a number such that $0 \leq a \leq 4$). Illustrative examples include tetrahalogenated titanium compounds such as titanium tetrachloride; trihalogenated alkoxytitanium compounds such as ethoxytitanium trichloride and butoxytitanium trichloride; dihalogenated dialkoxytitanium compounds such as diethoxytitanium dichloride and dibutoxytitanium dichloride; monohalogenated trialkoxytitanium compounds such as triethoxytitanium chloride and tributoxytitanium chloride; and tetraalkoxytitanium compounds such as tetraethoxytitanium and tetrabutoxytitanium. These titanium compounds may be used singly or as combinations of two or more thereof.

Magnesium compounds that may be used to prepare catalyst component A are exemplified by magnesium compounds which have a magnesium-carbon bond or a magnesium-hydrogen bond and have a reducing ability, and magnesium compounds which lack a reducing ability. Illustrative examples of magnesium compounds which have a reducing ability include dialkylmagnesium compounds such as dimethylmagnesium, diethylmagnesium, dibutylmagnesium and butylethylmagnesium; alkylmagnesium halides such as butylmagnesium chloride; alkylalkoxymagnesium compounds such as butylethoxymagnesium; and alkylmagnesium hydrides such as butylmagnesium hydride. These magnesium compounds having a reducing ability may also be used in the form of a complex compound with an organoaluminum compound.

Illustrative examples of magnesium compounds which lack a reducing ability include dihalogenated magnesium compounds such as magnesium dichloride; alkoxymagnesium halides such as methoxymagnesium chloride, ethoxymagnesium chloride and butoxymagnesium chloride; dialkoxymagnesium compounds such as diethoxymagnesium and dibutoxymagnesium; and magnesium carboxylates such as magnesium laurate and magnesium stearate. These magnesium compounds which lack a reducing ability may be compounds which are synthesized, either in advance or at the time of catalyst component A preparation, by a known method from a magnesium compound having a reducing ability.

Electron donors that may be used to prepare catalyst component A include oxygen-containing electron donors such as alcohols, phenols, ketones, aldehydes, carboxylic acids, esters of organic or inorganic acids, ethers, acid amides and acid anhydrides; nitrogen-containing electron donors such as ammonia, amines, nitriles and isocyanates; and organic acid halides. Of these electron donors, the use of inorganic acid esters, organic acid esters and ethers is preferred.

Preferred inorganic acid esters include silicon compounds having the general formula $R^2_n Si(OR^3)_{4-n}$ (where $R^2$ is a hydrocarbon group of 1 to 20 carbons or a hydrogen atom, $R^3$ is a hydrocarbon group of 1 to 20 carbons, and the letter n is a number such that $0 \leq n < 4$). Illustrative examples include tetraalkoxysilanes such as tetramethoxysilane, tetraethoxysilane and tetrabutoxysilane; alkyltrialkoxysilanes such as methyltrimethoxysilane, ethyltrimethoxysilane, butyltrimethoxysilane, isobutyltrimethoxysilane, t-butyltrimethoxysilane, methyltriethoxysilane, ethyltriethoxysilane, butyltriethoxysilane, isobutyltriethoxysilane and t-butyltriethoxysilane; and dialkyldialkoxysilanes such as dimethyldimethoxysilane, diethyldimethoxsilane, dibutyldimethoxysilane, diisobutyldimethoxysilane, di-t-butyldimethoxysilane, butylmethyldimethoxysilane, butylethyldimethoxysilane, t-butylmethyldimethoxysilane, dimethyldiethoxysilane, diethyldiethoxysilane, dibutyldiethoxysilane, diisobutyldiethoxysilane, di-t-butyldiethoxysilane, butylmethyldiethoxysilane, butylethyldiethoxysilane and t-butylmethyldiethoxysilane.

Preferred organic acid esters include monofunctional and polyfunctional carboxylic acid esters, such as aliphatic carboxylic acid esters, alicyclic carboxylic acid esters and aromatic carboxylic acid esters. Illustrative examples include methyl acetate, ethyl acetate, methyl propionate, ethyl propionate, ethyl butyrate, ethyl valerate, methyl acrylate, ethyl acrylate, methyl methacrylate, ethyl benzoate, butyl benzoate, methyl toluate, ethyl toluate, ethyl anisate, diethyl succinate, dibutyl succinate, diethyl malonate, dibutyl malonate, dimethyl maleate, dibutyl maleate, diethyl itaconate, dibutyl itaconate, diethyl phthalate, di-n-butyl phthalate and diisobutyl phthalate. Preferred examples include unsaturated aliphatic carboxylic acid esters such as methacrylic acid esters, and phthalic acid esters and maleic acid esters. Phthalic acid diesters are more preferred.

Illustrative examples of ethers include dialkyl ethers such as diethyl ether, dibutyl ether, diisobutyl ether, diamyl ether, diisoamyl ether, methyl butyl ether, methyl isoamyl ether and ethyl isobutyl ether. Preferred examples include dibutyl ether and diisoamyl ether.

Illustrative examples of organic acid halides include mono- and polyfunctional carboxylic acid halides, such as aliphatic carboxylic acid halides, alicyclic carboxylic acid halides and aromatic carboxylic acid halides. Illustrative examples include acetyl chloride, propionyl chloride, butyryl chloride, valeroyl chloride, acryloyl chloride, methacryloyl chloride, benzoyl chloride, toluoyl chloride, anisoyl chloride, succinyl chloride, malonyl chloride, maleyl chloride, itaconyl chloride and phthaloyl chloride. Preferred examples include aromatic carboxylic acid chlorides such as benzoyl chloride, toluoyl chloride and phthaloyl chloride. Phthaloyl chloride is especially preferred.

Examples of methods for preparing catalyst component A include the following.
(1) Reacting a liquid magnesium compound, or a complex compound of a magnesium compound and an electron donor, with a precipitating agent, then treating with a titanium compound or with a titanium compound and an electron donor.
(2) Treating a solid magnesium compound, or a complex compound of a solid magnesium compound and an electron donor, with a titanium compound or with a titanium compound and an electron donor.
(3) Reacting a liquid magnesium compound with a liquid titanium compound in the presence of an electron donor, and inducing the precipitation of a solid titanium complex.
(4) Further treating the reaction product obtained in method (1), (2) or (3) above with a titanium compound, or with an electron donor and a titanium compound.
(5) A method in which a solid product obtained by reducing an alkoxytitanium compound with an organomagnesium compound such as a Grignard reagent in the presence of an organosilicon compound having a Si—O bond is treated with an ester compound, an ether compound and titanium tetrachloride.
(6) A method in which a solid product obtained by reducing a titanium compound with an organomagnesium compound in the presence of an organosilicon compound or an organosilicon compound and an ester compound is treated by adding, in order, a mixture of an ether compound and titanium tetrachloride, followed by an organic acid halide compound, and the treated solid is subsequently treated with a mixture of an ether compound and titanium tetrachloride or a mixture of an ether compound, titanium tetrachloride and an ester compound.
(7) A method in which the product of the contact catalysis of a metal oxide, dihydrocarvyl magnesium and a halogen-containing alcohol is contacted with an electron donor and a titanium compound, either following treatment with a halogenating agent or without such treatment.
(8) A method in which a magnesium compound such as the magnesium salt of an organic acid or an alkoxymagnesium is contacted with an electron donor and a titanium compound, either following treatment with a halogenating agent or without such treatment.
(9) Treating the compound obtained in any of methods (1) to (8) above with a halogen, a halogen compound or an aromatic hydrocarbon.

Of the above methods for preparing catalyst component A, methods (1) to (6) are preferred. These methods of preparation are generally all carried out in an inert gas atmosphere, such as nitrogen or argon.

In the preparation of catalyst component A, the titanium compound, organosilicon compound and ester compound are preferably used after dissolution or dilution in a suitable solvent. Illustrative examples of such solvents include aliphatic hydrocarbons such as hexane, heptane, octane and decane; aromatic hydrocarbons such as toluene and xylene; alicyclic hydrocarbons such as cyclohexane, methylcyclohexane and decalin; and ether compounds such as diethyl ether, dibutyl ether, diisoamyl ether and tetrahydrofuran.

In the preparation of catalyst component A, the temperature of the reducing reaction which uses an organomagnesium compound is generally from −50 to +70° C. From the standpoint of catalyst activity and cost, the temperature is preferably from −30 to +50° C., and more preferably from −25 to +35° C. The dropwise addition time for the organomagnesium compound, while not subject to any particular limitation, is generally from about 30 minutes to about 12 hours. Following completion of the reducing reaction, subsequent reactions may be carried out at a temperature of from 20 to 120° C.

In the preparation of catalyst component A, the reducing reaction may be carried out in the presence of a porous material such as an inorganic oxide or an organic polymer so as to allow the solid product to impregnate into the porous material. Such porous materials preferably have a pore volume at a pore radius of from 20 to 200 nm of at least 0.3 ml/g and an average particle size of from 5 to 300 μm. Examples of porous inorganic oxides include $SiO_2$, $Al_2O_3$, MgO, $TiO_2$, $ZrO_2$ and composite oxides thereof. Examples of porous polymers include polystyrene-based porous polymers such as polystyrene and styrene-divinylbenzene copolymers; polyacrylate-based porous polymers such as polyethyl acrylate, methyl acrylate-divinyl benzene copolymers, polymethyl methacrylate and methyl methacrylate-divinylbenzene copolymers; and polyolefin-based porous polymers such as polyethylene, ethylene-methyl acrylate copolymers and polypropylene. Of these porous substances, $SiO_2$, $Al_2O_3$ and styrene-divinylbenzene copolymers are preferred.

The organoaluminum compound component used in the preparation of a Ziegler solid catalyst has at least one aluminum-carbon bond on the molecule and may typically have one of the following general formulas.

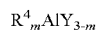
$$R^4_m AlY_{3-m}$$

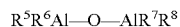
$$R^5 R^6 Al-O-AlR^7 R^8$$

In the above formulas, $R^4$ to $R^8$ are each hydrocarbon groups having from 1 to 8 carbons, and Y is a halogen atom, hydrogen or an alkoxy group. $R^4$ to $R^8$ may each be the same or different. Also, the letter m is a number such that $2 \leq m \leq 3$.

Illustrative examples of the organoaluminum compound component include trialkylaluminums such as triethylaluminum and triisobutylaluminum; dialkylaluminum hydrides such as diethylaluminum hydride and diisobutylaluminum hydride; dialkylaluminum halides such as diethylaluminum chloride and diisobutylaluminum chloride; mixtures of a trialkylaluminum with a dialkylaluminum halide, such as a mixture of triethylaluminum with diethylaluminum chloride; and alkylalumoxanes such as tetraethyldialumoxane and tetrabutyldialumoxane. Of these organoaluminum compounds, the use of a trialkylaluminum, a mixture of a trialkylaluminum with a dialkylaluminum halide, or an alkylalumoxane is preferred. The use of triethylaluminum, triisobutylaluminum, a mixture of triethylaluminum and diethylaluminum chloride, or tetraethyldialumoxane is more preferred.

Examples of the electron donor component used in the preparation of a Ziegler solid catalyst include the following commonly used electron donors: oxygen-containing electron donors such as alcohols, phenols, ketones, aldehydes, carboxylic acids, the esters of organic or inorganic acids, ethers, acid amides and acid anhydrides; and nitrogen-containing electron donors such as ammonia, amines, nitrites and isocyanates. Of these electron donor components, inorganic acid esters and ethers are preferred.

Preferred inorganic acid esters include silicon compounds of the general formula $R^9{}_n Si(OR^{10})_{4-n}$ (where $R^9$ is a hydrocarbon group of 1 to 20 carbons or a hydrogen atom, $R^{10}$ is a hydrocarbon group of 1 to 20 carbons, and the letter n is such that $0 \leq n < 4$). Illustrative examples include tetrabutoxysilane, butyltrimethoxysilane, tert-butyl-n-propyldimethoxysilane, dicyclopentyldimethoxysilane and cyclohexylethyldimethoxysilane.

Preferred ethers include dialkyl ethers, and diether compounds of the general formula

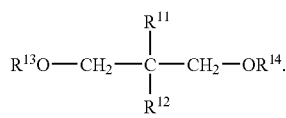

In the above formula, $R^{11}$ to $R^{14}$ are each independently a linear or branched alkyl, alicyclic hydrocarbon, aryl or aralkyl group of 1 to 20 carbons, although $R^{11}$ or $R^{12}$ may be a hydrogen atom. Illustrative examples include dibutyl ether, diamyl ether, 2,2-diisobutyl-1,3-dimethoxypropane and 2,2-dicyclopentyl-1,3-dimethoxypropane.

Of these electron donor components, an organosilicon compound of the general formula $R^{15}R^{16}Si(OR^{17})_2$ is especially preferred. Here, $R^{15}$ is a hydrocarbon group of 3 to 20 carbons in which the carbon atoms neighboring the silicon are secondary or tertiary. Illustrative examples include branched chain alkyl groups such as isopropyl, sec-butyl, tert-butyl and tert-amyl; cycloalkyl groups such as cyclopentyl and cyclohexyl; cycloalkenyl groups such as cyclopentenyl; and aryl groups such as phenyl and tolyl. In this formula, $R^{16}$ is a hydrocarbon group of 1 to 20 carbons, illustrative examples of which include straight chain alkyl groups such as methyl, ethyl, propyl, butyl and pentyl; branched alkyl groups such as isopropyl, sec-butyl, tert-butyl and tert-amyl; cycloalkyl groups such as cyclopentyl and cyclohexyl; cycloalkenyl groups such as cyclopentenyl; and aryl groups such as phenyl and tolyl. Also, in the above formula, $R^{17}$ is a hydrocarbon group of 1 to 20 carbons, and is preferably a hydrocarbon group of 1 to 5 carbons. Illustrative examples of organosilicon compounds that may be used as such electron donor components include tert-butyl-n-propyldimethoxysilane, dicyclopentyldimethoxysilane and cyclohexylethyldimethoxysilane.

In the preparation of a Ziegler solid catalyst, the organoaluminum compound component is used in an amount, per mole of titanium atoms in catalyst component A, of generally from 1 to 1,000 moles, and preferably from 5 to 800 moles. The electron donor component is used in an amount, per mole of titanium atoms in catalyst component A, of generally from 0.1 to 2,000 moles, preferably from 0.3 to 1,000 moles, and more preferably from 0.5 to 800 moles.

Catalyst component A, the organoaluminum compound component and the electron donor component may be brought into mutual contact before being fed to the multistage polymerization reactor, or may be separately fed to the multistage polymerization reactor, then contacted within the reactor. Alternatively, any two of these components may first be contacted with each other, and the remaining component subsequently brought into contact, or the respective components may be brought into mutual contact in a plurality of divided portions.

Examples of metallocene compounds that may be used to prepare the metallocene-type solid catalyst include transition metal compounds of the following general formula.

$$L_x M$$

In the formula, M is a transition metal, x is a number which satisfies the atomic valence of the transition metal M, and L is a ligand attached to the transition metal. At least one occurrence of L is a ligand having a cyclopentadienyl skeleton.

The transition metal M is preferably an atom from groups 3 to 6 of the Periodic Table of the Elements (IUPAC, 1989), and more preferably titanium, zirconium or hafnium.

Ligands L having a cyclopentadienyl skeleton are exemplified by (substituted) cyclopentadienyl groups, (substituted) indenyl groups and (substituted) fluorenyl groups. Illustrative examples include cyclopentadienyl, methylcyclopentadienyl, tert-butylcyclopentadienyl, dimethylcyclopentadienyl, tertbutyl-methylcyclopentadienyl, methyl-isopropylcyclopentadienyl, trimethylcyclopentadienyl, tetramethylcyclopentadienyl, pentamethylcyclopentadienyl, indenyl, 4,5,6,7-tetrahydroindenyl, 2-methylindenyl, 3-methylindenyl, 4-methylindenyl, 5-methylindenyl, 6-methylindenyl, 7-methylindenyl, 2-tert-butylindenyl, 3-tert-butylindenyl, 4-tert-butylindenyl, 5-tert-butylindenyl, 6-tert-butylindenyl, 7-tert-butylindenyl, 2,3-dimethyindeyl, 4,7-dimethylindenyl, 2,4,7-trimethylindenyl, 2-methyl-4-isopropylindenyl, 4,5-benzindenyl, 2-methyl-4,5-benzindenyl, 4-phenylindenyl, 2-methyl-5-phenylindenyl, 2-methyl-4-phenylindenyl, 2-methyl-4-naphthylindenyl, fluorenyl, 2,7-dimethylfluorenyl, 2,7-di-tert-butylfluorenyl and substituted versions of the above. In cases where there are a plurality of ligands having a cyclopentadienyl skeleton, these ligands may be mutually like or unlike.

Ligands L other than those having a cyclopentadienyl skeleton are exemplified by heteroatom-bearing groups, halogen atoms and hydrocarbon groups (excluding groups having a cyclopentadiene-type anion skeleton).

Examples of the heteroatom in the heteroatom-bearing group include oxygen, sulfur, nitrogen and phosphorus atoms. Such groups are exemplified by alkoxy groups, aryloxy groups, thioalkoxy groups, thioaryloxy groups, alkylamino groups, arylamino groups, alkylphosphino groups, arylphosphino groups, and aromatic or aliphatic heterocyclic groups having on the ring at least one atom selected from among oxygen, sulfur, nitrogen and phosphorus atoms. Illustrative examples of the halogen atoms include fluorine, chlorine, bromine and iodine atoms. The hydrocarbon groups are exemplified by alkyl, aralkyl, aryl and alkenyl groups.

Two or more ligands L may be directly linked to each other or may be linked through a residue containing at least one type of atom selected from among carbon, silicon, nitrogen, oxygen, sulfur and phosphorus atoms. Illustrative examples of such residues include alkylene groups such as methylene, ethylene and propylene; substituted alkylene groups such as dimethylmethylene (isopropylidene) and diphenylmethylene; silylene groups; substituted silylene groups such as dimethylsilylene, diethylsilylene, diphenylsilylene, tetramethyldisilylene and dimethoxysilylene; and heteroatoms such as nitrogen, oxygen, sulfur and phosphorus. Of these, methylene, ethylene, dimethylmethylene (isopropylidene), diphenylmethylene, dimethylsilylene, diethylsilylene, diphenylsilylene and dimethoxysilylene are especially preferred.

Illustrative examples of metallocene compounds include bis(cyclopentadienyl)zirconium dichloride, bis(methylcyclopentadienyl)zirconium dichloride, bis(indenyl)zirconium dichloride, bis(4,5,6,7-tetrahydroindenyl)zirconium dichloride, ethylenebis(indenyl)zirconium dichloride, dimethylsilylenebis(trimethylcyclopentadienyl)zirconium dichloride, dimethylsilylenebis(indenyl)zirconium dichloride and dimethylsilyl(tetramethylcyclopentadienyl)(3,5-di-tert-butyl-2-phenoxy)titanium dichloride. Additional examples include compounds in which the dichloride has been substituted with dimethoxide or diphenoxide groups.

Cocatalyst components that may be used in the preparation of metallocene-type solid catalysts include organoaluminumoxy compounds, organoaluminum compounds and boron compounds.

Illustrative examples of the organoaluminumoxy compounds include tetramethyldialuminoxane, tetraethyldialuminoxane, tetrabutyldialuminoxane, tetrahexyldialuminoxane, methylaluminoxane, ethylaluminoxane, butylaluminoxane and hexylaluminoxane.

Illustrative examples of organoaluminum compounds include trimethylaluminum, triethylaluminum, tri-n-butylaluminum, triisobutylaluminum and tri-n-hexylaluminum.

Illustrative examples of boron compounds include tris(pentafluorophenyl)borane, triphenylcarbenium tetrakis(pentafluorophenyl) borate, tri(n-butyl)ammonium tetrakis(pentafluorophenyl) borate and N,N-dimethylanilinium tetrakis(pentafluorophenyl) borate.

The granular carrier that may be used in the preparation of metallocene solid catalysts is preferably a porous substance, illustrative examples of which include inorganic oxides such as $SiO_2$, $Al_2O_3$, MgO, $ZrO_2$, $TiO_2$, $B_2O_3$, CaO, ZnO, BaO and $ThO_2$; clays or clayey minerals such as smectite, montmorillonite, hectorite, laponite and saponite; and organic polymers such as polyethylene, polypropylene and styrene-divinyl benzene copolymer.

Metallocene-type solid catalysts that may be used include those mentioned in, for example, Japanese Patent Application Laid-open No. S 60-35006, Japanese Patent Application Laid-open No. S 60-35007, Japanese Patent Application Laid-open No. S 60-35008, Japanese Patent Application Laid-open No. S 61-108610, Japanese Patent Application Laid-open No. S 61-276805, Japanese Patent Application Laid-open No. S 61-296008, Japanese Patent Application Laid-open No. S 63-89505, Japanese Patent Application Laid-open No. H 3-234709, Japanese Translation of PCT Application No. H 5-502906, Japanese Patent Application Laid-open No. H 6-336502 and Japanese Patent Application Laid-open No. H 7-224106.

When a metallocene-type solid catalyst is used in olefin polymerization, a cocatalyst component such as an organoaluminum compound or a boron compound may be used together if necessary. In such cases, the metallocene-type solid catalyst and the cocatalyst component may be brought into mutual contact prior to being fed into the polymerization reactor, or may be separately fed into the polymerization reactor and contacted within the reactor. Alternatively, the respective components may be brought into mutual contact in a plurality of divided portions.

The mass mean particle diameter of the above olefin polymerization catalyst is generally from 5 to 150 μm. In a gas phase polymerization reactor in particular, to suppress the scattering of particles to the reactor exterior, it is desirable to use a catalyst having a mass mean particle diameter of preferably at least 10 μm, and more preferably at least 15 μm. The polymerization catalyst in the present embodiment may include additives such as a fluidization aid and an antistatic additive. Together with the polymerization catalyst of the present embodiment, concomitant use may also be made of a chain transfer agent such as hydrogen for the purpose of regulating the molecular weight of the polymer.

The olefin polymerization catalyst may be a so-called prepolymerization catalyst which first induces polymerization in a small amount of olefin. Examples of olefins that may be used in prepolymerization include the olefins that may be used in the above-described polymerization. In this case, a single type of olefin may be used alone, or two or more different olefins may be used together.

Methods for producing the prepolymerization catalyst include, but are not limited to, slurry polymerization and gas phase polymerization. Of these, slurry polymerization is preferred. The use of the latter in production is sometimes economically advantageous. Production may be carried out using a batch system, a semibatch-type system or a continuous system.

The mass mean particle diameter of the prepolymerization catalyst is generally from 5 to 1,000 μm. In a gas phase polymerization reactor in particular, to minimize scatter to the exterior of the reactor, the mass mean particle diameter is preferably at least 10 μm, and more preferably at least 15 μm. Moreover, it is desirable for the amount of prepolymerization catalyst having a particle diameter of less than 20 μm, and especially less than 10 μm, to be low.

The polymerization catalyst may be introduced into the reactor as a suspension in a hydrocarbon solvent or the like. Introduction by entrainment with monomer gas or an inert gas such as nitrogen is also possible.

Polyolefin Production Process

Next, the process of producing a polyolefin using such a system is described. First, polyolefin particles containing a catalyst component having polymerization activity are formed in the olefin prepolymerization reactor 5 by a known method using an olefin polymerization catalyst.

Separately from the above, an olefin monomer gas is fed via line L30 into the olefin polymerization reactor 10A from the nozzle 40, the pressure is raised to the polymerization pressure, and the interior of the cylinder 12 is heated. The polymerization pressure, which may be any pressure within a range at which the olefin is capable of being present in the reactor as a gas phase, is generally from standard pressure to 10 MPaG, preferably from 0.2 to 8 MPaG, and more preferably from 0.5 to 5 MPaG. At a polymerization pressure below standard pressure, the productivity may decrease. On the other hand, at a reaction pressure above 10 MPaG, equipment costs for the reactor may become high. The polymerization temperature varies according to the type of monomer, the molecular weight of the product and other factors, although a temperature below the melting point of the olefin polymer, and preferably at least 10° C. lower than the melting point, is desirable. Specifically, the temperature is preferably from 0 to 120° C., more preferably from 20 to 100° C., and even more preferably from 40 to 100° C. It is preferable to carry out polymerization in an environment which is substantially free of moisture. The presence of moisture may lower the polymerization activity of the polymerization catalyst. Also, the presence of excess oxygen, carbon monoxide or carbon dioxide within the polymerization reaction system may lower the polymerization activity.

Next, polyolefin particles having a particle diameter of from about 0.5 mm to about 5.0 mm which have been obtained separately by a known method are fed to the cylinder 12 through a feed line (not shown) connected to line L5. The polyolefin particles fed into the cylinder 12 are most often particles which do not contain a catalyst component having a polymerization activity, although the presence within the particles of a catalyst component having a polymerization activity is acceptable.

When polyolefin particles are fed into the cylinder 12 while feeding an olefin monomer gas from the nozzle 40, as shown in FIG. 2, a spouted bed of polyolefin particles is formed within the reaction zone 25. That is, under the action of the gas from the gas inlet orifice, the particle concentration thins near the center axis of the cylinder 12 in the reaction zone 25 and a spout is formed in which particles flow upward together with the gas. Meanwhile, an annular structure of particles falling in the manner of a moving bed under the influence of gravity is formed at the periphery thereof, giving rise to the circulatory movement of particles within the reaction zone 25.

Once a spouted bed has been formed within each reaction zone 25, the polyolefin particles containing a catalyst component having a polymerization activity that were formed in the prepolymerization reactor 5 are fed from line L5 into the cylinder 12 at a constant rate per unit time, thereby commencing steady-state operation of the olefin polymerization reactor 10A. As the polyolefin particles containing a catalyst component having a polymerization activity grow within each reaction zone 25, they successively fall through the upper downcomers 35a and into the reaction zone 25 below, and are eventually discharged from the bottom downcomer 35b.

Meanwhile, part of the olefin monomer-containing gas forms a spout and sweeps past the particle bed, while the remainder of the gas diffuses into the portion of the particle bed having an annular structure. In this way, the olefin-containing gas and the polyolefin particles undergo solid-gas contact and the action of the catalyst within the polyolefin particles causes the olefin polymerization reaction to proceed, resulting in growth of the polyolefin particles.

For a stable spouted bed to form in each reaction zone 25, it is preferable that the following operating condition be satisfied; i.e., that the gas superficial velocity $U_0$ be equal to or greater than the minimum gas superficial velocity Ums at which a spouted bed is capable of forming. In addition to the physical properties of the powder and gases being handled, the minimum gas superficial velocity Ums is also influenced by the shape of the polymerization reactor. Various formulas have been proposed for calculating the minimum gas superficial velocity Ums. One example is formula (1) below.

$$Ums = \frac{d_P}{d_B}\left(\frac{d_A}{d_B}\right)^{1/3} \sqrt{\frac{2gL_S(\rho_S - \rho_G)}{\rho_G}} \times \left(\frac{\rho_G}{\rho_{AIR}}\right)^{0.2} \quad (1)$$

In this formula, $d_P$ is the particle diameter, $\rho_S$ is the particle density, $\rho_G$ is the gas density under the pressure and temperature conditions of the reaction zone, $\rho_{AIR}$ is the density of air under room temperature conditions, and $L_S$ is the height of the spouted bed.

The spouted bed height $L_S$ within the reaction zone 25 is equal to or less than the maximum spouted bed height $Ls_{MAX}$ at which a spouted bed is capable of forming, and is not subject to any particular limitation provided it is equal to or less than the maximum spouted bed height $Ls_{MAX}$. Various formulas for calculating the maximum spouted bed height $Ls_{MAX}$ have been proposed, one of which is formula (2) below.

$$\frac{Ls_{MAX}}{d_B} = \frac{d_B}{d_A}\left\{0.218 + \frac{0.005(\rho_S - \rho_G)gd_A}{\rho_G u_t u_{mf}}\right\} \quad (2)$$

In this formula, $u_t$ is the terminal velocity of the particles, and $u_{mf}$ is the minimum fluidization velocity.

From the standpoint of volume efficiency and enabling the formation of a more stable spouted bed, it is preferable for the spouted bed height $L_s$ to be higher than the tubular baffle 30.

As shown in FIG. 1, after obtaining a condensate by condensing some or all of the olefin-containing gas removed from the olefin polymerization reactor, the condensate may be fed to the cylinder 12 from a nozzle 50 located at an intermediate stage of the cylinder 12. This enables the olefin monomer consumed by the polymerization reaction to be replenished. In addition, when the liquid olefin monomer vaporizes within the cylinder 12, heat removal from the polyolefin particles is also possible owing to the latent heat of vaporization. In the plurality of reaction zones 25 within the cylinder 12, on account of the heat of reaction, the temperature of a reaction zone 25 tends to be higher the further up the reaction zone 25 is located within the cylinder 12, resulting in a temperature difference with lower reaction zones 25. Hence, to equalize the temperature, liquid olefin monomer is fed from a nozzle 50 provided at an intermediate stage of the cylinder 12, thereby enabling this temperature difference to be held to a minimum.

With the olefin polymerization reactor 10A according to the present embodiment, multiple spouted beds are formed within the cylinder 12, enabling the particle residence time distribution to be narrowed. Accordingly, in the continuous production of olefin polymer, it is possible to produce olefin polymer having an excellent structural uniformity. Moreover, when the production conditions are to be changed, because polyolefin particles polymerized prior to the change in conditions can be easily discharged from the cylinder 12, the amount of off-specification product that arises as a result can be cut to a sufficient degree. Also, by providing deflectors 20 to suppress the scattering of spouted particles, the freeboard zones can be shortened, enabling a high volume efficiency to be achieved.

Figure 3:
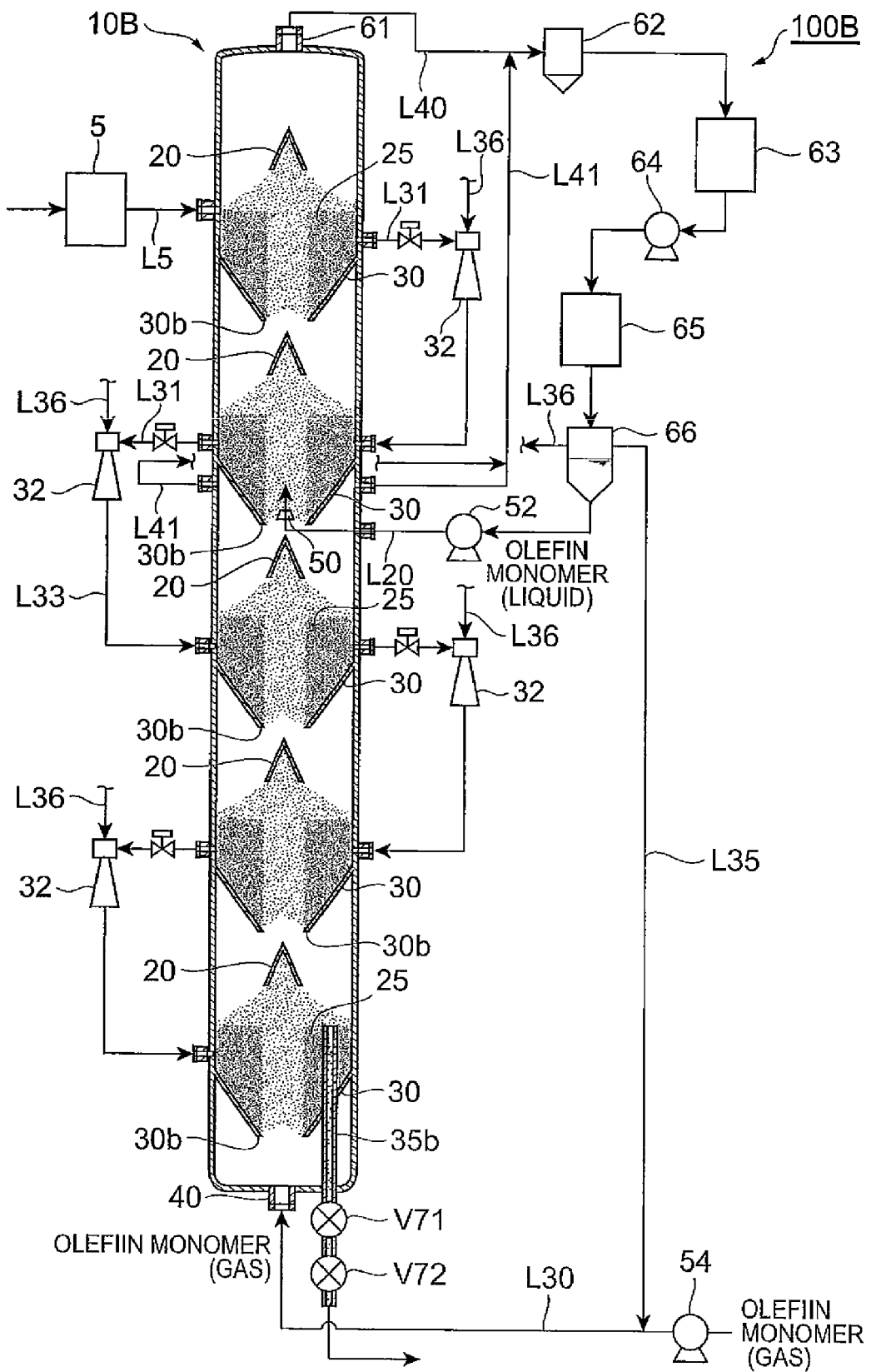
FIG. 3 is a schematic view of another embodiment of the polyolefin production system according to the invention.

The present invention is not limited to the above embodiment. For example, in the foregoing embodiment, downcomers 35a are employed as the means for transferring polyolefin particles from an upstream side reaction zone to a downstream side reaction zone. However, it is possible instead for the polyolefin particles to be transferred by an ejector system. The olefin polymerization reactor 10B of the polyolefin production system 110B shown in FIG. 3 has an ejector-based transferring means. Alternatively, although not shown, it is possible to use a transferring means called a double damper or a double bubble system which uses two, spaced apart, on-off valves provided on a circulation line to carry out powder transfer.

The transferring means of the olefin polymerization reactor 10B has a particle removing line L31 which removes polyolefin particles from an upstream side reaction zone 25, an ejector 32 provided at a front end of the particle removing line L31, and a particle feeding line L33 which feeds polyolefin particles from the ejector 32 to a downstream side reaction zone 25. In addition, an on-off valve is situated at an intermediate position on the particle removing line L31. The ejector 32 and the vapor-liquid separator 66 are linked together by a line L36 on which is disposed a compressor (not shown). Part of the recycled gas separated off by the gas-liquid separator 66 is fed as gas for ejector operation.

In the above embodiments, an olefin polymerization reactor in which five spouted beds are formed in the vertical direction has been described. However, the number of spouted beds is not limited to five, and may even be one. From the standpoint of achieving a sufficient plug flow effect, the number of spouted beds is preferably at least three, and more preferably at least six. Moreover, the plurality of spouted beds need not necessarily be formed in the vertical direction. For example, a plurality of reactors within each of which a single spouted bed is formed at the interior may be arranged in a horizontal direction and coupled in series. Also, in reactor design and the operation control method, it is preferable to design the volume of each reactor stage and control the polyolefin particle hold-up or residence time so as to narrow the residence time distribution of the polyolefin particles and to make the amount of polyolefin produced at each stage (including the olefin prepolymerization reactor 5) more uniform.

Moreover, in the above embodiments, a case in which a liquid feed nozzle 50 is disposed near the gas inlet orifice of the second tubular baffle 30 from the top. However, the positions and number of liquid feed nozzles 50 may be suitably set according to the type of polyolefin particles to be produced. For example, if the temperatures of the respective reaction zones 25 can be equalized by some other means, it may not be necessary to provide liquid feed nozzles 50. Alternatively, a liquid feed nozzle 50 may be provided near the gas inlet orifice at each of the tubular baffles 30.

In addition, each of the downcomers 35a and 35b mentioned in one of the above embodiments has a top end that protrudes above a tubular baffle 30. However, in cases where the polyolefin particles are impeded from flowing between the outside surfaces of these downcomers 35a and 35b and the inside surface of the cylinder 12 or the inside surfaces of the tubular baffles 30, the downcomers 35a and 35b may be constructed so as not to protrude above the inside surfaces of the respective tubular baffles 30. In such a case, a mechanism (e.g., an on-off valve) for regulating the amount of particles which drop from an upper reaction zone 25 to a lower reaction zone 25 may be suitably provided on each downcomer.

Figure 4:
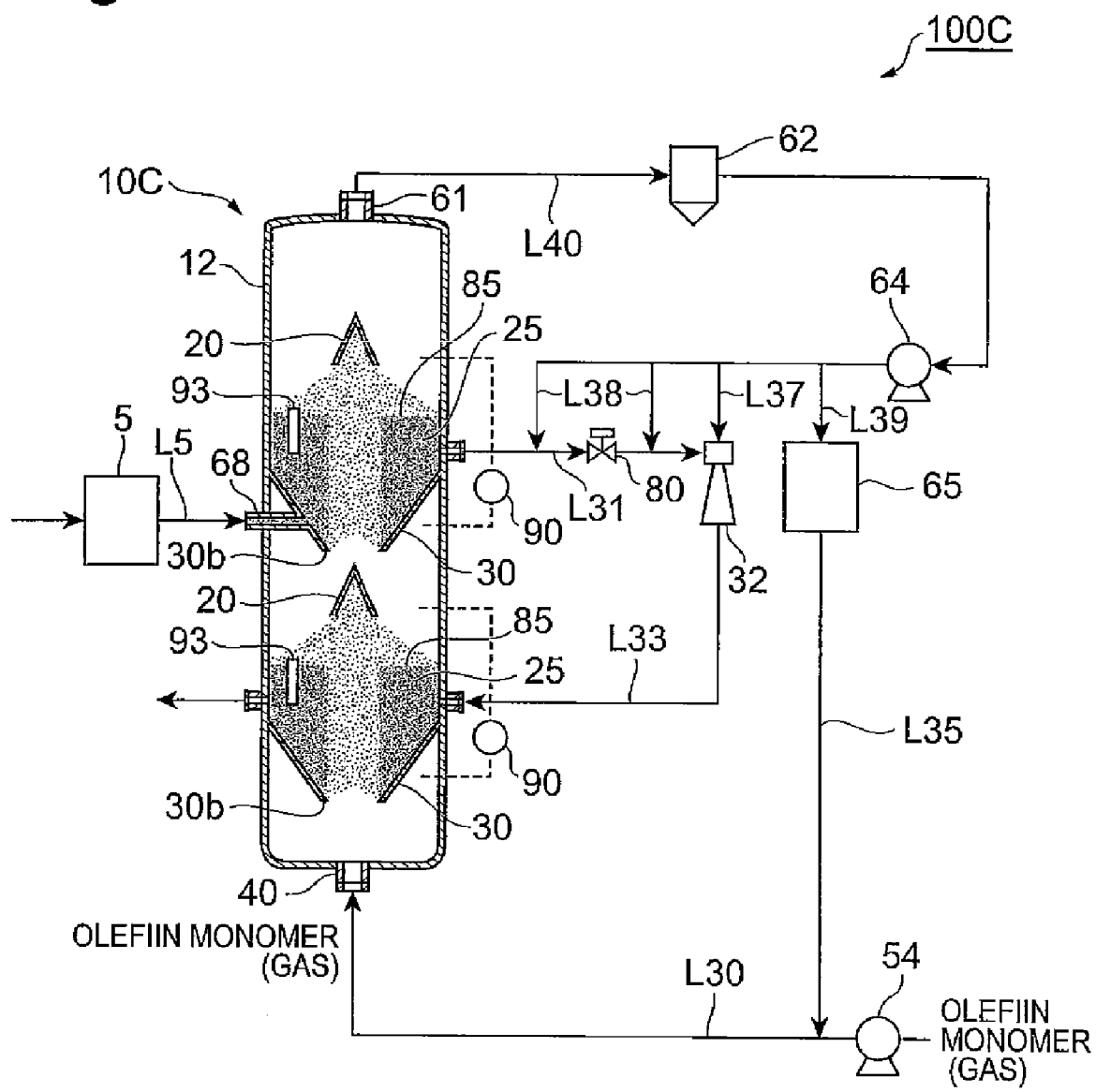
FIG. 4 is a schematic view of yet another embodiment of the polyolefin production system according to the invention.

Next, a preferred arrangement of the polyolefin production system which employs a bulk polymerization reactor as the olefin prepolymerization reactor and employs an ejector system as the transferring means is described in detail while referring to FIG. 4. The polyolefin production system 100C shown in FIG. 4 includes a bulk polymerization reactor 5 and an olefin polymerization reaction 10C having at the interior both top and bottom reaction zones 25.

The bulk polymerization reactor 5 polymerizes an olefin in a liquid phase containing an olefin polymerization catalyst, thereby forming polyolefin particles. The polyolefin particles formed in the bulk polymerization reactor 5 pass through a line L5 together with liquid olefin, and are fed to the olefin polymerization reactor 10C. A nozzle 68 for feeding a slurry to the top reaction zone 25 is provided, as shown in FIG. 4, at a position lower than the powder level 85 of the spouted bed. When the slurry is fed into the reaction zone 25 from a position lower than the powder level 85, it is preferable to regulate the slurry feed rate so that the superficial velocity, following gasification, of the liquid olefin within the slurry does not exceed the minimum fluidization rate ($U_{mf}$) of the polyolefin particles held within the reaction zone 25. By regulating the slurry feed rate in this way, it is possible to fully prevent the flow state of the spouted bed from becoming unstable with gasification of the liquid olefin inside the reaction zone 25.

In the arrangement just described, the slurry is fed from a position lower than the powder level 85. However, the slurry feeding position is not limited to such a position. For example, the nozzle 68 may be provided at a position higher than the powder level 85. This has the advantage that, even when the amount of slurry fed per unit time is made relatively high, the flow state of the spouted bed can be kept from becoming unstable with the gasification of the liquid olefin.

As shown in FIG. 4, a gas feeding nozzle 40 provided at the bottom of the cylinder 12 feeds a gaseous olefin monomer to the bottom of the cylinder 12 via a line L30 and a compressor 54. A gas discharge nozzle 61 is provided at the top of the cylinder 12. Gases that have risen through the cylinder 12 are discharged to the exterior via line L40, and gas-entrained particles are discharged by a cyclone 62 that is optionally provided. The gases pass through a compressor 64 and a heat exchanger 65, then are introduced to line L30 via line L35 and recycled.

As described above, the olefin polymerization reactor 10C uses an ejector system as the transferring means. This transferring means includes a particle removing line L31 which removes polyolefin particles from the upper reaction zone 25, an ejector 32 provided at a front end of the particle removing line L31, and a particle feeding line L33 which feeds polyolefin particles from the ejector 32 to the bottom reaction zone 25. An on-off valve 80 is situated along the particle removing line L31. Lines 38 are connected to the particle removing line L31 on the upstream side and the downstream side of this on-off valve 80, enabling a gas for preventing clogging to be fed into the particle removing line L31 via the gas feeding lines L38.

Part of the gas that has been pressurized by the compressor 64 is fed through line L37 to the ejector 32. This gas is used for ejector operation. In addition, part of the gas pressurized by the compressor 64 is fed through the lines L38 to the particle removing line L31 on the upstream and downstream sides of the on-off valve 80. This gas is used to prevent clogging of the on-off valve 80 and the ejector 32.

The flow rate of the ejector operating gas is not subject to any particular limitation, provided it is an amount which is capable of discharging the polyolefin particles. The amount of gas used to prevent clogging is preferably about 10 parts by volume per 100 parts by volume of the gas for operating the ejector. To reliably prevent clogging of the on-off valve 80 and the ejector 32, it is preferable for the gas to be fed constantly through lines L38 to the upstream and downstream sides of the on-off valve 80 during operation of the olefin polymerization reactor 10C, regardless of the open or closed state of the on-off valve 80.

The olefin polymerization reactor 10C has capacitance type level gauges 93 and differential pressure gauges 90 for measuring the heights of the spouted beds (the positions of the powder levels 85). The use of both the capacitance type level gauges 93 and the differential pressure gauges 90 enables displacements in the powder levels 85 to be more accurately understood. To prevent clogging of the connection lines for the differential pressure gauges 90, it is preferable to carry out line blowing constantly or periodically.

EXAMPLES

Example 1

A cylindrical cold model reactor made of transparent polyvinyl chloride and capable of forming two spouted beds inside the cylinder was furnished to investigate the residence time distribution in an olefin polymerization reactor according to the present invention. This unit had two tubular baffles of inverted conical shape with a gas inlet orifice therein, each of which was paired with a conical deflector, disposed vertically and coaxially within the cylinder.

The cylindrical cold model reactor had an inside diameter $d_B$ of 500 mm, and the gas inlet orifice at the bottom end of each tubular baffle had a diameter $d_A$ of 100 mm. Accordingly, in the present example, the ratio $d_A/d_B$ between the gas inlet orifice diameter $d_A$ and the cylinder inside diameter $d_B$ was 0.2.

The angle of inclination between the inside surfaces of the tubular baffles of inverted conical shape and the horizontal and the angle of inclination between the outside surfaces of the deflectors and the horizontal were each 65°. The two tubular baffles having an inverted conical shape were each provided with a downcomer having an inside diameter of 40 mm. The conical deflectors had an inside diameter at the bottom end of 300 mm, and were hollow at the interior.

The gas introduced into the unit was room-temperature air, which was fed in at a rate of 7.5 m³ per minute. The particles used were polypropylene particles having an average particle size of 1,100 μm. The top reaction zone and the bottom reaction zone were each filled with 30 kg of polypropylene particles, and spouted beds were formed in the respective reaction zones by feeding in gas at the above-indicated rate from the gas inlet orifice in the bottom tubular baffle.

An amount of polypropylene particles identical to the amount continuously discharged from the downcomer was subsequently fed in from the topmost portion of the unit. Next, 3 kg of polypropylene particles having the same average particle size and colored red was fed in for a limited time, the amount of colored particles in the particles discharged outside of the reactor was monitored over time and, using this as the pseudo impulse response (delta response), a transient response curve was obtained. To monitor the amount of colored particles, the a* value in the L*a*b* color system was measured with a color difference meter (Color Computer SM-5, manufactured by Suga Test Instruments Co., Ltd.) and the amount of colored particles was determined based on a previously prepared working curve.

Figure 5:
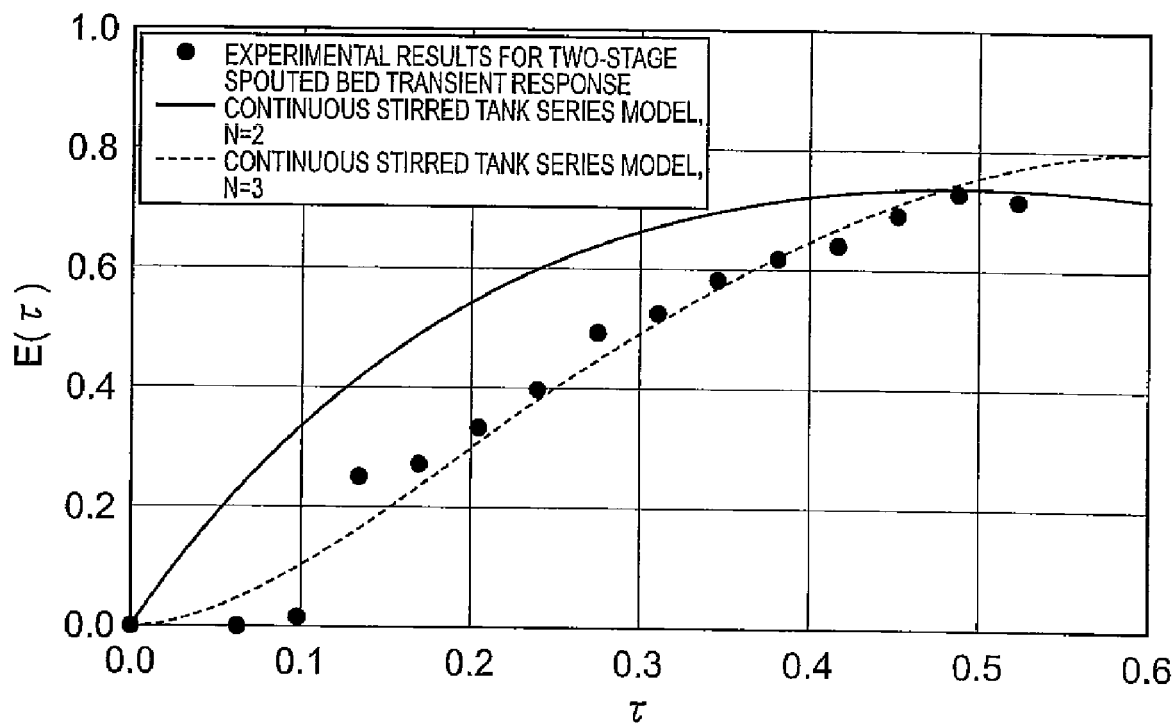
FIG. 5 is a graph showing a normalized transient response curve obtained in Example 1.

FIG. 5 shows the normalized transient response curve in Example 1, and also the data for both a two-tank series and a three-tank series in a continuous stirred tank series reactor model. In this example, by forming two spouted beds, a plug flow performance comparable to that of a continuous stirred three-tank series model (three fluidized beds) was obtained.

Although the polypropylene particles (average particle size, 1,100 mm) used in this example are classified as B particles in the Geldart classification of particle fluidization properties and thus can be easily fluidized, it was confirmed that spouted beds stably form even with such particles.

Examples 2 to 9

Examples 2 to 9 below were carried out to investigate the relationship between the stability of a spouted bed formed in a reaction zone and the shape of the tubular baffle.

Example 2

A cylindrical cold model reactor made of transparent polyvinyl chloride and capable of forming a single spouted bed inside the cylinder was furnished for use. This reactor had, disposed within the cylinder, a single tubular baffle with an inverted conical shape having a gas inlet orifice and, paired with the baffle, a single deflector with a conical shape.

The cylindrical cold model unit had an inside diameter $d_B$ of 500 mm, and the gas inlet orifice at the bottom end of the tubular baffle had a diameter $d_A$ of 100 mm. Accordingly, in the present example, the ratio $d_A/d_B$ between the gas inlet orifice diameter $d_A$ and the cylinder inside diameter $d_B$ was 0.2.

The angle of inclination between the inside surface of the tubular baffle having an inverted conical shape and the horizontal and the angle of inclination between the outside surface of the deflector and the horizontal were each 65°. The conical deflector had an inside diameter at the bottom end of 300 mm, and was hollow at the interior.

The interior of the reactor was filled with 40 kg of polypropylene particles having an average particle size of 1,100 μm. A gas was fed in from the gas inlet orifice, and the flow state of the polypropylene particles was observed. The gas introduced into the unit was room-temperature air, which was fed in at a rate of 7.5 m³ per minute.

As a result, an ordinary spouted bed flow state was observed in which the particle concentration near the center axis of the cylinder was low, a spout of upwardly flowing gas and particles stably formed, and particles dropped down in a moving bed state at the periphery thereof.

Example 3

Aside from setting the diameter $d_A$ of the gas inlet orifice at the bottom end of the tubular baffle to 75 mm instead of 100 mm, air was fed to the particle bed in the same way as in Example 2 and the flow state of the polypropylene particles was observed. In this example, the ratio $d_A/d_B$ between the diameter $d_A$ of the gas inlet orifice and the cylinder inside diameter $d_B$ was 0.15. As in Example 2, an ordinary spouted bed flow state was observed in the present example.

Example 4

Aside from setting the diameter $d_A$ of the gas inlet orifice at the bottom end of the tubular baffle to 125 mm instead of 100 mm, air was fed to the particle bed in the same way as in Example 2 and the flow state of the polypropylene particles was observed. In this example, the ratio $d_A/d_B$ between the diameter $d_A$ of the gas inlet orifice and the cylinder inside diameter $d_B$ was 0.25. As in Example 2, an ordinary spouted bed flow state was observed in the present example.

Example 5

Aside from feeding 7.1 m³/min of air to a particle bed composed of polypropylene particles having an average size of 900 μm instead of feeding 7.5 m³/min of air to a particle bed composed of polypropylene particles having an average size of 1,100 μm, air was fed to the particle bed in the same way as in Example 2 and the flow state of the polypropylene particles was observed. In this example, the ratio $d_A/d_B$ between the diameter $d_A$ of the gas inlet orifice and the cylinder inside diameter $d_B$ was 0.2. As in Example 2, an ordinary spouted bed flow state was observed in the present example.

Example 6

Aside from setting the diameter $d_A$ of the gas inlet orifice at the bottom end of the tubular baffle to 75 mm instead of 100 mm, air was fed to the particle bed in the same way as in Example 2 and the flow state of the polypropylene particles was observed. In this example, the ratio $d_A/d_B$ between the diameter $d_A$ of the gas inlet orifice and the cylinder inside diameter $d_B$ was 0.15. As in Example 2, an ordinary spouted bed flow state was observed in the present example.

Example 7

Aside from setting the diameter $d_A$ of the gas inlet orifice at the bottom end of the tubular baffle to 125 mm instead of 100 mm, air was fed to the particle bed in the same way as in Example 5 and the flow state of the polypropylene particles was observed. In this example, the ratio $d_A/d_B$ between the diameter $d_A$ of the gas inlet orifice and the cylinder inside diameter $d_B$ was 0.25. As in Example 2, an ordinary spouted bed flow state was observed in the present example.

Example 8

Aside from setting the diameter $d_A$ of the gas inlet orifice at the bottom end of the tubular baffle to 50 mm instead of 100 mm, air was fed to the particle bed in the same way as in Example 2 and the flow state of the polypropylene particles was observed. In this example, the ratio $d_A/d_B$ between the diameter $d_A$ of the gas inlet orifice and the cylinder inside diameter $d_B$ was 0.10. The formation of a spouted bed, although unstable, was confirmed in this example. That is, the spout moved off-center, forming at a position other than the center axis of the cylinder, which in turn resulted in a variation in the height of the particle bed peripheral to the spout. In addition, the spout forming position was observed to change irregularly over time.

Example 9

Aside from setting the diameter $d_A$ of the gas inlet orifice at the bottom end of the tubular baffle to 50 mm instead of 100 mm, air was fed to the particle bed in the same way as in Example 5 and the flow state of the polypropylene particles was observed. In this example, the ratio $d_A/d_B$ between the diameter $d_A$ of the gas inlet orifice and the cylinder inside diameter $d_B$ was 0.10. The formation of a spouted bed, although unstable, was confirmed in this example. That is, the spout moved off-center, forming at a position other than the center axis of the cylinder, which in turn resulted in a variation in the height of the particle bed peripheral to the spout. In addition, the spout forming position was observed to change irregularly over time.

Examples 10 to 13, and Comparative Examples 1 to 3

The polyolefin production process carried out in Examples 10 to 12 of the invention included a step (Polymerization Step II) in which propylene homopolymerization was carried out using a spouted bed reactor. The polyolefin production process carried out in Comparative Examples 1 to 3 included a step (Polymerization Step II) in which propylene homopolymerization was carried out using a fluidized bed reactor instead of a spouted bed reactor. The polyolefin production process carried out in Example 13 of the invention included a step (Polymerization Step III) in which propylene-ethylene copolymerization was carried out using a spouted bed reactor. In Examples 10 to 13 and Comparative Examples 1 to 3, the physical properties of the polymer were measured and evaluated as described below.

(i) Intrinsic Viscosity (Units: dl/g)

Three different samples were prepared by dissolving the polymer in 1,2,3,4-tetrahydronaphthalene solvent to predetermined concentrations. The polymer concentrations of the respective samples were set to 0.1 g/dl, 0.2 g/dl and 0.5 g/dl. The reduced viscosities of these samples were measured at a temperature of 135° C. using an Ubbelohde viscometer. In accordance with the method of calculation described on page 491 of *Kōbunshi yōeki* [Polymer solutions], which is volume 11 of *Kōbunshi Jikkengaku* [Experimental polymer science] (1982, Kyoritsu Shuppan), the reduced viscosity was plotted versus the concentration, and the intrinsic viscosity was determined by extrapolating the concentration to zero.

(ii) Ethylene Unit Content (Units: wt %)

The ethylene unit content was determined by the IR spectrum method, in accordance with IR spectrum measurement described on page 619 of *Kōbunshi handobukku* [The polymer handbook] (1995, Kinokuniya Shoten). As used herein, "ethylene unit" refers to structural units which originate from ethylene.

(iii) Polymerization Activities in Respective Polymerization Steps (Units: g/g)

The polymerization activities were calculated by dividing the weight (g) of polymer produced in each polymerization step by the weight (g) of the solid catalyst component fed to that polymerization step.

(iv) Copolymer Component Content $F_{EP}$ (Units: wt %)

The copolymer component content $F_{EP}$ (Units: wt %) was calculated using the following formula.

$$F_{EP} = W_{EP}/W_t \times 100$$

In the formula, $W_t$ stands for the total amount of polymer produced (homopolymer component and copolymer component combined) per unit time, and $W_{EP}$ is the amount of copolymer component produced per unit time in Polymerization Step (III).

(v) Intrinsic Viscosity of Polymer Produced in Respective Polymerization Steps (Units: dl/g)

The intrinsic viscosity $[\eta]_{P1}$ of the polymer component produced in Polymerization Step (I), the intrinsic viscosity $[\eta]_{P2}$ of the polymer component produced in Polymerization Step (II), and the intrinsic viscosity $[\eta]_{EP}$ of the copolymer component produced in Polymerization Step (III) were calculated using the following formulas.

$$[\eta]_{P1} = [\eta]_1$$

$$[\eta]_{P2} = ([\eta]_2 - [\eta]_{P1} \times W_{P1}/(W_{P1}+W_{P2})) \times (W_{P1}+W_{P2})/W_{P2}$$

$$[\eta]_{EP} = ([\eta]_3 - [\eta]_{P1} \times W_{P1}/100 - [\eta]_{P2} \times W_{P2}/100) \times 100/W_{EP}$$

Where $[\eta]_1$: intrinsic viscosity (dl/g) of polymer from Polymerization Step (I)

$[\eta]_2$: intrinsic viscosity (dl/g) of polymer following Polymerization Step (II)

$[\eta]_3$: intrinsic viscosity (dl/g) of polymer following Polymerization Step (III)

$W_{P1}$: Amount of polymer produced in Polymerization Step (I) (kg/h)

$W_{P2}$: Amount of polymer produced in Polymerization Step (II) (kg/h)

(vi) Ethylene Unit Content of Polymer Component Produced in Respective Polymerization Steps (Units: wt %)

The ethylene unit content $E_{EP}$ (units: wt %) of the polymer component produced in Polymerization Step (III) was computed from the following formula.

$$E_{EP}=E_3\times 100/F_{EP}$$

Here, $E_3$ is the ethylene unit content (units: wt %) of the polymer following Polymerization Step (III).

(vii) Fisheye Count (Unit: Count/100 cm²)

The polymer was fed to a T-die film-forming machine (manufactured by Tanabe Plastics Kikai; T-die width, 100 mm) equipped with a single-screw extruder having a screw diameter of 20 mm, and a 50 μm thick sheet was manufactured at a temperature of 210° C. The resulting sheet was placed on the platen of a scanner (GT-9600), manufactured by Seiko Epson Corporation; resolution, 1600 dpi). Next, a Hansa Hard Chrome Ferrotype Plate (produced under this brand name by Omiya Shashin Yohin KK) was placed over the sheet with the mirror-finished side of the plate facing the sheet. Setting the scanner resolution to 900 dpi and the tonal gradations for each pixel to 8 bits, an image of the sheet was entered into the computer as a black-and-white image and saved in a bitmapped format. This image was digitized using image analysis software (produced by Asahi Kasei Engineering Corporation under the brand name "A-zo kun"®). Fisheyes were recognized as areas that are brighter than their surroundings. Because the fisheyes were of indefinite shape, the size of each fisheye was equated to the diameter of a circle of the same surface area, and the number of fisheyes having a diameter of 200 μm or more was determined. The fisheye count was the number of such fisheyes per 100 cm² of the sheet.

Example 10

Prepolymerization

A 3-liter stainless steel autoclave equipped with a stirrer was charged with 1.5 L of thoroughly dehydrated and deaerated n-hexane, 37.5 mmol of triethylaluminum and 3.75 mmol of cyclohexylethyldimethoxysilane. To this was added 15 g of a solid catalyst component, following which 15 g of propylene was continuously fed in over a period of about 30 minutes while holding the temperature within the autoclave at about 10° C., thereby carrying out prepolymerization. The prepolymerization slurry was then transferred to a stirrer-equipped 150-liter autoclave made of SUS 316L stainless steel and 100 L of liquid butane was added, thereby giving a prepolymerization catalyst component slurry. The solid catalyst component used was one prepared by the same method as that described in Examples 4 (1) and (2) of Japanese patent Application Laid-open No. 2004-182981.

Polymerization Step I (Propylene Homopolymerization Using Slurry Polymerization Reactor)

Propylene homopolymerization was carried out using a stirrer-equipped 42-liter Bessel-type slurry polymerization reactor made of SUS 304 stainless steel. The polymerization reaction was carried out while continuously feeding propylene, hydrogen, triethylaluminum, cyclohexylethyldimethoxysilane and the prepolymerization catalyst component slurry into the reactor. The reaction conditions were as follows.

Polymerization temperature: 70° C.
Stirring speed: 150 rpm
Liquid level in reactor: 18 L
Propylene feed rate: 25 kg/h
Hydrogen feed rate: 215 NL/h
Triethylaluminum feed rate: 45.3 mmol/h
Cyclohexylethyldimethoxysilane feed rate: 6.6 mmol/h
Prepolymerization catalyst component slurry feed rate (polymerization catalyst component basis): 0.557 g/h
Polymerization pressure: 4.1 MPa (gauge pressure)

In this reactor, the slurry had a mean residence time of 0.29 hour, and polypropylene particles were discharged at a rate of 2.67 kg/h. The polymerization activity in this polymerization step was 4,790 g/g. The polypropylene particles obtained had an intrinsic viscosity of 0.93 dl/g.

Polymerization Step II (Propylene Homopolymerization by Spouted Bed Reactor (Gas-phase Polymerization))

A spouted bed reactor having two reaction zones in the vertical direction (1,440-liter capacity; inside diameter, 500 mm) was furnished for use. The tubular baffles and deflectors were made of SUS 304 stainless steel (with surfaces finished by buffing at a grit size of 300), and the material making up the rest of the reactor was SUS 316 (with surfaces finished by buffing at a grit size of 300). The reactor was converted for use here from a fluidized bed reactor with stirrer. That is, the stirrer and gas dispersion plate within the original reactor were taken out and, in their place, combinations of a tubular baffle and a deflector were installed coaxially at each of two stages in the vertical direction. The tubular baffles and deflectors used here had the same shape and size as those used in Example 3.

A slurry containing polypropylene particles and liquid propylene was fed intermittently in a plurality of divided portions from the slurry polymerization reactor in the preceding step to the top reaction zone in the spouted bed reactor. The slurry polymerization reactor and the spouted bed reactor are connected via a line, and the amount of slurry fed to the spouted bed reactor is regulated by an on-off valve provided on this line.

The following two slurry feeding methods were tried when feeding the slurry to the top reaction zone of the spouted bed reactor. In one method, the slurry was fed into the reaction zone from a higher position than the powder level of the spouted bed. In the other method, the slurry was fed into a position lower than the powder level of the spouted bed; that is, directly into the particle bed. It was confirmed that the slurry can be fed without difficulty by either method. Moreover, it was learned from these tests that, when the method of feeding the slurry directly into the particle bed is used, feeding the slurry intermittently at a frequency of about 100 times per hour and thus making the amount of slurry fed at one time small is effective for maintaining the flow state of the spouted bed. Limiting the feed rate of the slurry makes it possible to keep the superficial velocity following gasification of the liquid propylene present in the slurry from exceeding the minimum fluidization velocity in the reaction zone. This presumably makes it possible to suppress fluctuations within the system associated with gasification of the liquid propylene, increasing the stability of the flow state in the spouted bed. Another advantage of feeding the slurry directly to the particle bed is that the latent heat of vaporization from the gasification of propylene can be used particularly effectively to remove the heat of polymerization. The results shown in Table 1 were obtained, in Examples 10 and 11 and in Comparative Examples 1 to 3, for polymers obtained using the method in which the slurry is fed directly to the particle bed. In Examples 12 and 13, the results were obtained for polymers obtained using the method in which the slurry is fed from a position higher than the powder level of the particle bed.

The spouted bed reactor used in the present example has an ejector-based transferring means (see FIG. 4). This transferring means, which is designed to transfer polypropylene particles from the upper reaction zone to the lower reaction zone, includes a particle removing line with an on-off valve, an ejector and a particle feeding line. Moreover, 10 vol % of the circulating gases (gases discharged from the top of the spouted bed reactor) were fed as a gas for operating the ejector. In addition, 1 vol % of the circulating gases were fed to the upstream and downstream sides of the on-off valve on the particle removing tube to prevent obstruction. It was confined that, by feeding this obstruction-preventing gas to both the upstream and downstream sides of the on-off valve, clogging can be more reliably prevented than when such a gas is fed only to the upstream side or the downstream side alone.

Propylene and hydrogen were continuously fed from the bottom of the spouted bed reactor having the above construction. In this way, a spouted bed was formed in each of the top and bottom reaction zones, in addition to which propylene homopolymerization was carried out while purging excess gas to keep the pressure constant. The reaction conditions were as follows.
Polymerization temperature: 80° C.
Polymerization pressure: 1.8 MPa (gauge pressure)
Circulating gas flow rate: 140 m$^3$/h
Propylene feed rate: 20 kg/h
Hydrogen feed rate: 1,150 NL/h
Polypropylene particle hold-up: 60 kg (top stage, 30 kg; bottom stage, 30 kg).

In this reactor, the polypropylene particles had a mean residence time of 4.6 hours, the concentration ratio of the gases within the reactor (hydrogen/(hydrogen+propylene)) was 10.4 mol %, and the polymer particle discharge rate was 14.9 g/h. The polymerization activity in this polymerization step was 21,900 g/g. The polypropylene particles obtained had an intrinsic viscosity of 0.93 dl/g.

Polymerization Step III (Propylene-ethylene Copolymer Obtained with Fluidized Bed Reactor (Gas-phase Polymerization))

The polypropylene particles discharged from the spouted bed reactor in the previous stage were fed continuously to a fluidized bed reactor (capacity, 980 L). The fluidized bed reactor was made of SUS 316L stainless steel (the inside surface of the reactor and the surfaces of the interior components were finished by buffing to a grit size of 300). The reactor was equipped with a gas dispersion plate and a stirrer.

Propylene, ethylene and hydrogen were continuously fed to this fluidized bed reactor, and propylene and ethylene copolymerization was carried out in the presence of polypropylene particles while purging excess gas to hold the pressure constant. The reaction conditions were as follows.
Polymerization temperature: 70° C.
Polymerization pressure: 1.4 MPa (gauge pressure)
Circulating gas flow rate: 140 m$^3$/h
Propylene feed rate: 34 kg/h
Ethylene feed rate: 7.3 kg/h
Hydrogen feed rate: 49 NL/h
Polymer particle hold-up: 55 kg In this reactor, the polymer particles had a mean residence time of 2.7 hours. The gases within the reactor had the following concentration ratios: ethylene/(propylene+ethylene), 27 mol %; hydrogen/(hydrogen+propylene+ethylene), 0.79 mol %. The polymer particle discharge rate was 20.6 kg/h. The polymerization activity in this polymerization step was 10,300 g/g. The copolymer component in the polymer particles obtained had an intrinsic viscosity of 4.08 dl/g, a content of 27.9 wt %, and an ethylene unit content of 33 wt %. The results are shown in Table 1.

Example 11

Polymerization Step I (Propylene Homopolymerization Using Slurry Polymerization Reactor)

Aside from changing the following reaction conditions, propylene homopolymerization was carried out in the same way as in Polymerization Step I of Example 10.
Reactor fluid level: 30 L
Propylene feed rate: 16 kg/h
Hydrogen feed rate: 137 NL/h
Triethylaluminum feed rate: 37.8 mmol/h
Cyclohexylethyldimethoxysilane feed rate: 5.6 mmol/h
Prepolymerization catalyst component slurry feed rate (polymerization catalyst component basis): 0.591 g/h In this reactor, the slurry had a mean residence time of 0.84 hour, and the rate at which the polypropylene particles were discharged was 6.61 kg/h. The polymerization activity in this polymerization step was 11,200 g/g. The polypropylene particles thus obtained had an intrinsic viscosity of 0.92 dl/g.

Polymerization Step II (Propylene Homopolymerization by Spouted Bed Reactor (Gas Phase Polymerization))

The polypropylene particles obtained in Polymerization Step I were fed to a reactor having the same construction as the spouted bed reactor used in Polymerization Step II of Example 10. Aside from setting the polypropylene particle hold-up to 46 kg (top stage, 23 kg; bottom stage, 23 kg), propylene homopolymerization was carried out in the same way as in Polymerization Step II of Example 10.

In this reactor, the polypropylene particles had a mean residence time of 3.1 hours. The rate of polypropylene particle discharge was 14.7 kg/h. The polymerization activity in this polymerization step was 13,600 g/g. The resulting polypropylene particles had an intrinsic viscosity of 0.90 dl/g.

Polymerization Step II (Propylene-ethylene Copolymerization with Fluidized Bed Reactor (Gas Phase Polymerization))

The polypropylene particles obtained from Polymerization Step II above were fed to a reactor having the same construction as the fluidized bed reactor used in Polymerization Step III of Example 10. Aside from setting the hold-up of the polypropylene particles to 60 kg, propylene and ethylene copolymerization was carried out in the presence of polypropylene particles in the same way as in Polymerization Step III of Example 10.

In this reactor, the polymer particles had a mean residence time of 3.1 hours. The polymer particles were discharged at a rate of 19.7 kg/h. The polymerization activity in this polymerization step was 8,470 g/g. The copolymer component present in the resulting polymer particles had an intrinsic viscosity of 4.99 dl/g, a content of 25.4 wt %, and an ethylene unit content of 38 wt %. The results are shown in Table 1.

Example 12

Polymerization Step I (Polypropylene Homopolymerization Using Slurry Polymerization Reactor)

Aside from changing the following reaction conditions, propylene homopolymerization was carried out in the same way as in Polymerization Step I of Example 10.
Triethylaluminum feed rate: 35.1 mmol/h
Cyclohexylethyldimethoxysilane feed rate: 5.3 mmol/h
Prepolymerization catalyst component slurry feed rate (polymerization catalyst component basis): 0.566 g/h In this reactor, the slurry had a mean residence time of 0.79 hour, and the rate at which the polypropylene particles were discharged was 4.93 kg/h. The polymerization activity in this polymerization step was 8,710 g/g. The polypropylene particles thus obtained had an intrinsic viscosity of 0.90 dl/g.

Polymerization Step II (Propylene Homopolymerization by Spouted Bed Reactor (Gas Phase Polymerization))

The polypropylene particles obtained in Polymerization Step I were fed to a reactor having the same construction as the spouted bed reactor used in Polymerization Step II of Example 10. Aside from changing the following reaction conditions, propylene homopolymerization was carried out in the same way as in Polymerization Step II of Example 10.
Polymerization temperature: 70° C.
Hydrogen feed rate: 1,360 NL/h
Polypropylene particle hold-up: 57 kg (top stage, 28.5 kg; bottom stage, 28.5 kg)

In this reactor, the polypropylene particles had a mean residence time of 4.2 hours. The rate of polypropylene particle discharge was 13.6 kg/h. The polymerization activity in this polymerization step was 15,300 g/g. The resulting polypropylene particles had an intrinsic viscosity of 0.97 dl/g.

Polymerization Step III (Propylene-ethylene Copolymerization with Fluidized Bed Reactor (Gas Phase Polymerization))

Polypropylene particles obtained from Polymerization Step II above were fed to a reactor having the same construction as the fluidized bed reactor used in Polymerization Step III of Example 10. Propylene and ethylene copolymerization was thereby carried out in the presence of polypropylene particles in the same way as in Polymerization Step III of Example 10.

In this reactor, the polymer particles had a mean residence time of 3.6 hours. The polymer particles were discharged at a rate of 19.7 kg/h. The polymerization activity in this polymerization step was 10,800 g/g. The copolymer component present in the resulting polymer particles had an intrinsic viscosity of 4.30 dl/g, a content of 30.9 wt %, and an ethylene unit content of 32 wt %. The results are shown in Table 1.

Comparative Example 1

Polymerization Step I (Polypropylene Homopolymerization Using Slurry Polymerization Reactor)

Propylene homopolymerization was carried out in the same way as in Polymerization Step I of Example 10.

Polymerization Step II (Propylene Homopolymerization by Fluidized Bed Reactor (Gas Phase Polymerization))

A fluidized bed reactor (capacity, 1,440 L; inside diameter, 500 mm) was furnished for use. This reactor was made of SUS 316L stainless steel (with the inside surface of the reactor and the surfaces of internal components finished by buffing to a grit size of 300), and equipped in the reaction zone with a stirrer.

A slurry containing polypropylene particles and liquid propylene was fed intermittently from the slurry polymerization reactor of the previous stage to the fluidized bed reactor as a plurality of divided portions, in addition to which propylene and hydrogen were continuously fed from the bottom of the reactor. A fluidized bed was thereby formed within the reactor, and propylene homopolymerization was carried out while purging excess gas to hold the pressure constant. The reaction conditions were as follows.
Polymerization temperature: 80° C.
Polymerization pressure: 1.8 MPa (gauge pressure)
Circulating gas flow rate: 140 m$^3$/h
Propylene feed rate: 20 kg/h
Hydrogen feed rate: 1,150 NL/h
Hold-up: 60 kg In this reactor, the polypropylene particles discharged had an intrinsic viscosity of 0.96 dl/g. The polymerization activity in this polymerization step was 16,600 g/g, which was low compared to Polymerization Step II of Example 10.

Polymerization Step II (Propylene-ethylene Copolymerization with Fluidized Bed Reactor (Gas Phase Polymerization))

Polypropylene particles obtained from Polymerization Step II above were fed to a reactor having the same construction as the fluidized bed reactor used in Polymerization Step III of Example 10. Aside from setting the hold-up of the polymer particles to 40 kg, propylene and ethylene copolymerization was carried out in the presence of polypropylene particles in the same way as in Polymerization Step III of Example 10.

In this reactor, the polymer particles had a mean residence time of 2.2 hours. The polymerization activity in this polymerization step was 7,040 g/g. The copolymer component present in the resulting polymer particles had an intrinsic viscosity of 3.60 dl/g, a content of 26.1 wt %, and an ethylene unit content of 33 wt %. The results are shown in Table 1.

Comparative Example 2

Polymerization Step I (Polypropylene Homopolymerization Using Slurry Polymerization Reactor)

Propylene homopolymerization was carried out in the same way as in Polymerization Step I of Example 11.

Polymerization Step II (Propylene Homopolymerization by Fluidized Bed Reactor (Gas Phase Polymerization))

A slurry containing polypropylene particles and liquid propylene was fed intermittently from the slurry polymerization reactor of the previous stage to the fluidized bed reactor as a plurality of divided portions, in addition to which propylene and hydrogen were continuously fed from the bottom of the reactor. A fluidized bed was thereby formed within the reactor, and propylene homopolymerization was carried out while purging excess gas to hold the pressure constant. This reactor had the same construction as the fluidized bed reactor used in Polymerization Step II of Comparative Example 1. The reaction conditions were as follows.
Polymerization temperature: 80° C.
Polymerization pressure: 1.8 MPa (gauge pressure)
Circulating gas flow rate: 140 m$^3$/h
Propylene feed rate: 20 kg/h
Hydrogen feed rate: 1,150 NL/h
Hold-up: 46 kg In this reactor, the polypropylene particles discharged had an intrinsic viscosity of 0.91 dl/g. The polymerization activity in this polymerization step was 12,900 g/g, which was low compared to Polymerization Step II of Example 11.

Polymerization Step III (Propylene-ethylene Copolymerization with Fluidized Bed Reactor (Gas Phase Polymerization))

Polypropylene particles obtained from Polymerization Step II above were fed to a reactor having the same construction as the fluidized bed reactor used in Polymerization Step III of Example 11. Aside from setting the hold-up of the polymer particles to 65 kg, propylene and ethylene copolymerization was carried out in the presence of polypropylene particles in the same way as in Polymerization Step III of Example 11.

In this reactor, the polymer particles had a mean residence time of 3.4 hours. The polymerization activity in this polymerization step was 7,540 g/g. The copolymer component present in the resulting polymer particles had an intrinsic viscosity of 4.11 dl/g, a content of 24.4 wt %, and an ethylene unit content of 32 wt %. The results are shown in Table 1.

Comparative Example 3

Polymerization Step I (Polypropylene Homopolymerization Using Slurry Polymerization Reactor)
Propylene homopolymerization was carried out in the same way as in Polymerization Step I of Example 12.
Polymerization Step II (Propylene Homopolymerization by Fluidized Bed Reactor (Gas Phase Polymerization))
A slurry containing polypropylene particles and liquid propylene was fed intermittently from the slurry polymerization reactor of the previous stage to the fluidized bed reactor as a plurality of divided portions, in addition to which propylene and hydrogen were continuously fed from the bottom of the reactor. A fluidized bed was thereby formed within the reactor, and propylene homopolymerization was carried out while purging excess gas to hold the pressure constant. This reactor had the same construction as the fluidized bed reactor used in Polymerization Step II of Comparative Example 1. The reaction conditions were as follows.
Polymerization temperature: 70° C.
Polymerization pressure: 1.8 MPa (gauge pressure)
Circulating gas flow rate: 140 m³/h
Propylene feed rate: 20 kg/h
Hydrogen feed rate: 1,360 NL/h
Hold-up: 57 kg
In this reactor, the polypropylene particles discharged had an intrinsic viscosity of 0.93 dl/g. The polymerization activity in this polymerization step was 14,200 g/g, which was low compared to Polymerization Step II of Example 12.
Polymerization Step III (Propylene-ethylene Copolymerization with Fluidized Bed Reactor (Gas Phase Polymerization))
Polypropylene particles obtained from Polymerization Step II above were fed to a reactor having the same construction as the fluidized bed reactor used in Polymerization Step III of Example 10. Aside from setting the hold-up of the polymer particles to 65 kg, propylene and ethylene copolymerization was carried out in the presence of polypropylene particles in the same way as in Polymerization Step III of Example 12.
In this reactor, the polymer particles had a mean residence time of 3.4 hours. The polymerization activity in this polymerization step was 10,500 g/g. The copolymer component present in the resulting polymer particles had an intrinsic viscosity of 4.20 dl/g, a content of 27.9 wt %, and an ethylene unit content of 33 wt %. The results are shown in Table 1.

Example 13

Polymerization Step I-1 (Propylene Homopolymerization Using Slurry Polymerization Reaction)
Aside from changing the following reaction conditions, propylene homopolymerization was carried out in the same way as in
Polymerization Step I of Example 10.
Polymerization temperature: 78° C.
Propylene feed rate: 20 kg/h
Hydrogen feed rate: 169 NL/h
Triethylaluminum feed rate: 39.9 mmol/h
Cyclohexylethyldimethoxysilane feed rate: 5.7 mmol/h
Prepolymerization catalyst component slurry feed rate (polymerization catalyst component basis): 0.968 g/h
Polymerization pressure: 4.5 MPa (gauge pressure)
In this reactor, the slurry had a mean residence time of 0.31 hour, and the rate at which the polypropylene particles were discharged was 3.65 kg/h. The polymerization activity in this polymerization step was 3,770 g/g. The polypropylene particles thus obtained had an intrinsic viscosity of 0.92 dl/g.
Polymerization Step I-2 (Propylene Homopolymerization Using Slurry Polymerization Reactor)
The slurry discharged from the reactor in the previous stage was directly fed into a 163-liter Bessel-type slurry polymer reaction equipped with a stirrer and made of SUS 304 stainless steel, and propylene homopolymerization was carried out without interruption. The reaction conditions were as follows.
Polymerization temperature: 76° C.
Stirring rate: 150 rpm
Liquid level in reactor: 44 L
Propylene feed rate: 10 kg/h
Hydrogen feed rate: 50 NL/h
Polymerization pressure: 4.0 MPa (gauge pressure)
In this reactor, the slurry had a mean residence time of 0.68 hour, and the rate of polypropylene particle discharge was 10.3 kg/h. The polymerization activity in this polymerization step was 6,830 g/g. The resulting polypropylene particles had an intrinsic viscosity of 0.92 dl/g.
Polymerization Step I-3 (Propylene Homopolymerization Using Slurry Polymerization Reactor)
The propylene particles obtained in above Polymerization Step I-2 were fed to a reactor having the same construction as the slurry polymerization reactor used in Polymerization Step I-2. Aside from changing the following reaction conditions, propylene homopolymerization was carried out in the same way as in above Polymerization Step I-2.
Polymerization temperature: 69° C.

TABLE 1

| | | Unit | EX 10 | CE 1 | EX 11 | CE 2 | EX 12 | CE 3 |
|---|---|---|---|---|---|---|---|---|
| Polymerization Step I | Polymerization activity | g/g | 4,790 | | 11,200 | | 8,710 | |
| | Intrinsic viscosity $[\eta]_{P1}$ | dl/g | 0.93 | | 0.92 | | 0.9 | |
| | Temperature | ° C. | 80 | 80 | 80 | 80 | 70 | 70 |
| Polymerization Step II | Polymerization activity | g/g | 21,900 | 16,600 | 13,600 | 12,900 | 15,300 | 14,200 |
| | Intrinsic viscosity $[\eta]_{P2}$ | dl/g | 0.93 | 0.96 | 0.9 | 0.91 | 0.97 | 0.93 |
| | Temperature | ° C. | 80 | 80 | 80 | 80 | 70 | 70 |
| Polymerization Step III | Polymerization activity | g/g | 10,300 | 7,040 | 8,470 | 7,540 | 10,800 | 10,500 |
| | Copolymer component content $F_{EP}$ | wt % | 27.9 | 26.1 | 25.4 | 24.4 | 30.9 | 27.9 |
| | Intrinsic viscosity $[\eta]_{EP}$ | dl/g | 4.08 | 3.6 | 4.99 | 4.11 | 4.3 | 4.2 |
| | Ethylene unit content $E_{EP}$ | wt % | 33 | 33 | 38 | 32 | 32 | 33 |
| Evaluation of final polymer | Intrinsic viscosity | dl/g | 1.81 | 1.65 | 1.94 | 1.69 | 1.72 | 1.81 |
| | Ethylene unit content | wt % | 9.1 | 8.6 | 9.5 | 7.9 | 10 | 9.3 |
| | Fisheye count | count/100 cm² | 3,648 | 4,739 | 2,315 | 2,866 | 879 | 2,392 |

Propylene feed rate: 0 kg/h
Hydrogen feed rate: 0 NL/h
Polymerization pressure: 3.8 MPa (gauge pressure)

In this reactor, the slurry had a mean residence time of 0.61 hour, and the rate of polypropylene particle discharge was 15.0 kg/h. The polymerization activity in this polymerization step was 4,900 g/g. The resulting polypropylene particles had an intrinsic viscosity of 0.92 dl/g.

Polymerization Step III (Propylene-ethylene Copolymerization with Spouted Bed Reactor (Gas Phase Polymerization))

Polypropylene particles obtained from Polymerization Step I-3 above, and also propylene, ethylene and hydrogen, were fed to a reactor having the same construction as the spouted bed reactor used in Polymerization Step II of Example 10. In this way, a spouted bed was formed in each of the top and bottom reaction zones, in addition to which the copolymerization of propylene and ethylene was carried out in the presence of polypropylene particles while purging excess gas to keep the pressure constant. The reaction conditions were as follows.
Polymerization temperature: 70° C.
Polymerization pressure: 1.4 MPa (gauge pressure)
Circulating gas flow rate: 150 m³/h
Propylene feed rate: 25 kg/h
Ethylene feed rate: 10.3 kg/h
Hydrogen feed rate: 85 NL/h
Hold-up: 55 kg (top stage, 27.5 kg; bottom stage, 27.5 kg).

In this reactor, the polymer particles had a mean residence time of 2.8 hours, and the concentration ratios of the gases within the reactor were as follows: ethylene/(propylene+ethylene), 27 mol %; (hydrogen/(hydrogen+propylene+ethylene), 0.67 mol %. The polymer particle discharge rate was 17.8 g/h. The polymerization activity in this polymerization step was 2,890 g/g. The copolymer component included in the polymer particles thus obtained had an intrinsic viscosity of 3.79 dl/g, a content of 15.7 wt %, and an ethylene unit content of 35.7 wt %. The results are shown in Table 2.

TABLE 2

|  |  | Unit | Example 13 |
|---|---|---|---|
| Polymerization Step I-1 | Polymerization activity | g/g | 3,770 |
|  | Intrinsic viscosity $[\eta]_{P1-1}$ | dl/g | 0.92 |
| Polymerization Step I-2 | Polymerization activity | g/g | 6,830 |
|  | Intrinsic viscosity $[\eta]_{P1-2}$ | dl/g | 0.92 |
| Polymerization Step I-3 | Polymerization activity | g/g | 4,900 |
|  | Intrinsic viscosity $[\eta]_{P1-3}$ | dl/g | 0.92 |
| Polymerization Step III | Polymerization activity | g/g | 2,890 |
|  | Copolymer component content $F_{EP}$ | wt % | 15.7 |
|  | Intrinsic viscosity $[\eta]_{EP}$ | dl/g | 3.79 |
|  | Ethylene unit content $E_{EP}$ | wt % | 35.7 |
| Evaluation of final polymer | Intrinsic viscosity | dl/g | 1.37 |
|  | Ethylene unit content | wt % | 5.6 |

What is claimed is:

1. A spouted bed-type olefin polymerization reactor comprising:
 a cylinder which extends vertically; and
 a decreasing diameter member which is formed on the cylinder, has an inside diameter that decreases progressively downward, and has a gas inlet orifice at a bottom end thereof,
 wherein a spouted bed is formed inside a reaction zone enclosed by an inside surface of the decreasing diameter member and an inside surface of the cylinder above the decreasing diameter member.

2. An olefin polymerization reactor comprising:
 a cylinder which extends vertically;
 a decreasing diameter member which is formed on the cylinder, has an inside diameter that decreases progressively downward, and has a gas inlet orifice at a bottom end thereof; and
 a deflector which is disposed at a position, within a reaction zone enclosed by an inside surface of the decreasing diameter member and an inside surface of the cylinder above the decreasing diameter member, that faces the gas inlet orifice, and which has an outside diameter that increases progressively downward, is closed at a top end thereof, and a bottom end of which is spaced apart from an inside wall of the cylinder.

3. The olefin polymerization reactor of claim 1 which has a plurality of the reaction zones and wherein polyolefin particles pass sequentially through the reaction zones.

4. The olefin polymerization reactor of claim 2 which has a plurality of the reaction zones and wherein polyolefin particles pass sequentially through the reaction zones.

5. The olefin polymerization reactor of claim 3, wherein the plurality of reaction zones are each formed in a vertical row and the polyolefin particles pass sequentially from an upper reaction zone to a lower reaction zone.

6. The olefin polymerization reactor of claim 3, further comprising means for transferring the polyolefin particles from an upstream-side reaction zone to a downstream-side reaction zone.

7. The olefin polymerization reactor of claim 3, further comprising means for transferring the polyolefin particles from an upstream-side reaction zone to a downstream-side reaction zone, wherein the transferring means comprises a particle removing line for removing polyolefin particles from the upstream-side reaction zone, an ejector provided on the particle removing line, and a particle feeding line for feeding polyolefin particles from the ejector to the downstream-side reaction zone.

8. The olefin polymerization reactor of claim 7, wherein the transferring means further comprises an on-off valve provided at an intermediate position on the particle removing line, and a gas feeding line which communicates with the particle removing line on both an upstream side and a downstream side of the on-off valve and feeds a gas to prevent clogging within the particle removing line.

9. The olefin polymerization reactor of claim 6, wherein the transferring means is a downcomer which passes through the decreasing diameter member and allows the polyolefin particles to fall from the upstream-side reaction zone to the downstream-side reaction zone.

10. The olefin polymerization reactor of claim 1, wherein the decreasing diameter member has an angle of inclination between the inside surface thereof and the horizontal, which is larger than an angle of repose for the polyolefin particles within the reaction zone.

11. The olefin polymerization reactor of claim 2, wherein the decreasing diameter member has an angle of inclination between the inside surface thereof and the horizontal, which is larger than an angle of repose for the polyolefin particles within the reaction zone.

12. The olefin polymerization reactor of claim 1, wherein the decreasing diameter member has an angle of inclination between the inside surface thereof and the horizontal, which is an angle at which all of the polyolefin particles within the reaction zone can be gravitationally discharged.

13. The olefin polymerization reactor of claim 2, wherein the decreasing diameter member has an angle of inclination between the inside surface thereof and the horizontal, which is an angle at which all of the polyolefin particles within the reaction zone can be gravitationally discharged.

14. The olefin polymerization reactor of claim 13 wherein the ratio $d_A/d_B$ between the orifice diameter $d_A$ of the gas inlet orifice and the cylinder inside diameter $d_B$ is 0.35 or less.

15. The olefin polymerization reactor of claim 2, wherein the ratio $d_A/d_B$ between the orifice diameter $d_A$ of the gas inlet orifice and the cylinder inside diameter $d_B$ is 0.35 or less.

16. The olefin polymerization reactor of claim 2, wherein the deflector has an angle of inclination between an outside surface thereof and the horizontal, which is larger than an angle of repose for the polyolefin particles within the reaction zone.

17. The olefin polymerization reactor of claim 2, wherein the deflector has an outside surface of conical shape.

18. A polyolefin production process which comprises carrying out olefin polymerization by using the olefin polymerization reactor of claim 1 to form a spouted bed of polyolefin particles within the reaction zone.

19. A polyolefin production process which comprises carrying out olefin polymerization by using the olefin polymerization reactor of claim 2 to form a spouted bed of polyolefin particles within the reaction zone.

20. The polyolefin production process of claim 18, comprising the steps of:
continuously feeding olefin to the olefin polymerization reactor and at the same time continuously removing a gas containing unreacted olefin from the olefin polymerization reactor and returning the removed gas to the reactor; and
cooling some or all of the removed gas so as to obtain an olefin-containing condensate.

21. The polyolefin production process of claim 20, further comprising the step of feeding the condensate to a spout portion of the spouted bed formed within the reaction zone.

22. A polyolefin production process which comprises carrying out olefin polymerization by using the olefin polymerization reactor of claim 2 to form a spouted bed of polyolefin particles within the reaction zone, the process comprising the steps of:
continuously feeding olefin to the olefin polymerization reactor and at the same time continuously removing a gas containing unreacted olefin from the olefin polymerization reactor and returning the removed gas to the reactor;
cooling some or all of the removed gas so as to obtain an olefin-containing condensate; and
feeding the condensate to a bottom portion of the deflector in the olefin polymerization reactor.

23. A polyolefin production system comprising:
an olefin pre-reactor for polymerizing olefin in the presence of an olefin polymerization catalyst and forming polyolefin particles; and
the olefin polymerization reactor of claim 1 which is connected as a subsequent stage to the olefin pre-reactor.

24. A polyolefin production system comprising:
an olefin pre-reactor for polymerizing olefin in the presence of an olefin polymerization catalyst and forming polyolefin particles; and
the olefin polymerization reactor of claim 2 which is connected as a subsequent stage to the olefin pre-reactor.

25. A polyolefin production process which comprises carrying out multistage olefin polymerization using the polyolefin production system of claim 23.

26. The polyolefin production process of claim 25, wherein the olefin pre-reactor is a bulk polymerization reactor, and the process further comprises the step of feeding a slurry containing polyolefin particles and liquid olefin from the bulk polymerization reactor to the olefin polymerization reactor,
the slurry being fed to the olefin polymerization reactor in such a manner that, in the reaction zone within the olefin polymerization reactor, the liquid olefin present in the slurry has a superficial velocity following gasification which does not exceed a minimum fluidization velocity of the polyolefin particles held in the reaction zone.

27. The polyolefin production process of claim 25, wherein the olefin pre-reactor is a bulk polymerization reactor, and the process further comprises the step of feeding a slurry containing polyolefin particles and liquid olefin from the bulk polymerization reactor to the olefin polymerization reactor,
the slurry being fed to the olefin polymerization reactor from a higher position than a powder level of the spouted bed that is formed in the reaction zone within the olefin polymerization reactor.

* * * * *